(12) United States Patent
Toh

(10) Patent No.: US 9,548,617 B2
(45) Date of Patent: Jan. 17, 2017

(54) BATTERY-CHARGING BASE FOR MOBILE INFORMATION TERMINALS

(71) Applicant: Tadamine Toh, Kanagawa (JP)

(72) Inventor: Tadamine Toh, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 14/350,122

(22) PCT Filed: Oct. 4, 2012

(86) PCT No.: PCT/JP2012/076373
§ 371 (c)(1),
(2) Date: Apr. 7, 2014

(87) PCT Pub. No.: WO2013/061796
PCT Pub. Date: May 2, 2013

(65) Prior Publication Data
US 2014/0285150 A1    Sep. 25, 2014

(30) Foreign Application Priority Data

Oct. 24, 2011    (JP) ................................ 2011-232514

(51) Int. Cl.
*H02J 7/00*    (2006.01)
*H02J 7/04*    (2006.01)
(Continued)

(52) U.S. Cl.
CPC .......... *H02J 7/0044* (2013.01); *H04M 1/0274* (2013.01); *H04M 1/04* (2013.01);
(Continued)

(58) Field of Classification Search
USPC ................ 320/115, 107, 110, 112, 113, 114, 137,320/128, 135
See application file for complete search history.

(56) References Cited

U.S. PATENT DOCUMENTS 5,940,502 A    8/1999    Hirai et al.
6,084,963 A    7/2000    Hirai et al.
(Continued)

FOREIGN PATENT DOCUMENTS

CN    1187078 A    7/1998
CN    101276945 A    10/2008
(Continued)

OTHER PUBLICATIONS

International Search Report for PCT/JP2012/076373 dated Dec. 18, 2012.
(Continued)

*Primary Examiner* — Alexis A Boateng
(74) *Attorney, Agent, or Firm* — Sughrue Mion, PLLC

(57) ABSTRACT

A battery-charging base for a portable information device, which is provided so as to easily connect and disconnect, to and from a battery-charging plug connector, a battery-charging slot for a portable information terminal, is a battery-charging base that is capable of holding one of a plurality of types of portable information terminals that are different in length and width sizes and positions of battery-charging slots provided at lower ends thereof, and charging the held one of the plurality of types of portable information terminals by inserting the battery-charging plug connector into the battery-charging slot of the held one of the plurality of types of portable information terminals. The battery-charging base for a portable information terminal includes: a holding base main body for holding the one of the plurality of types of portable information terminals on a main mounting surface inclined with respect to a horizontal surface; and a battery-charging cover including a first housing section capable of housing the battery-charging plug connector while changing a housing position thereof, the battery-charging cover being fixed to a lower end of the main
(Continued)

mounting surface in a freely removable manner. The battery-charging cover is configured to support the lower end of the one of the plurality of types of portable information terminals to be held on the main mounting surface, and is rotatable about a first rotation axis provided at a lower end portion thereof.

9 Claims, 20 Drawing Sheets

(51) Int. Cl.
*H04M 1/04* (2006.01)
*H04M 1/02* (2006.01)

(52) U.S. Cl.
CPC ............ *H02J 7/0027* (2013.01); *H02J 7/045* (2013.01); *H04M 1/02* (2013.01)

(56) References Cited

U.S. PATENT DOCUMENTS

| | | | |
|---|---|---|---|
| 6,791,528 B2* | 9/2004 | Adler | 345/102 |
| 6,994,575 B1 | 2/2006 | Clark et al. | |
| 7,065,658 B1* | 6/2006 | Baraban et al. | 713/300 |
| 7,628,628 B2* | 12/2009 | Matsuda et al. | 439/248 |
| 7,675,264 B2* | 3/2010 | Lin et al. | 320/115 |
| 7,715,187 B2* | 5/2010 | Hotelling et al. | 361/679.41 |
| 8,083,195 B2* | 12/2011 | Osada | 248/274.1 |
| 8,183,825 B2* | 5/2012 | Sa | 320/107 |
| 8,358,777 B2* | 1/2013 | Hsieh et al. | 379/428.04 |
| D676,016 S * | 2/2013 | Akatsu et al. | D14/142 |
| 8,538,477 B2* | 9/2013 | Goodman et al. | 455/556.1 |
| 8,545,247 B2* | 10/2013 | Aldana et al. | 439/248 |
| 8,659,262 B2* | 2/2014 | Goto et al. | 320/107 |
| 2002/0086703 A1* | 7/2002 | Dimenstein et al. | 455/557 |
| 2008/0037767 A1* | 2/2008 | Gullickson et al. | 379/428.02 |
| 2009/0179610 A1* | 7/2009 | Lin | 320/101 |
| 2010/0158297 A1* | 6/2010 | Stuczynski | 381/332 |
| 2010/0176762 A1* | 7/2010 | Daymude et al. | 320/115 |
| 2011/0084657 A1 | 4/2011 | Toya et al. | |
| 2011/0095724 A1* | 4/2011 | Byrne | 320/115 |
| 2011/0300900 A1* | 12/2011 | Fleming et al. | 455/555 |
| 2012/0046074 A1* | 2/2012 | Gittleman et al. | 455/557 |
| 2012/0161706 A1* | 6/2012 | Zhou | 320/115 |
| 2012/0299547 A1* | 11/2012 | Lee et al. | 320/115 |

FOREIGN PATENT DOCUMENTS

| | | |
|---|---|---|
| CN | 102044894 A | 5/2011 |
| JP | 10-200611 A | 7/1998 |
| JP | 11-348677 A | 12/1999 |
| JP | 2006-172371 A | 6/2006 |
| JP | 2008-92159 A | 4/2008 |
| JP | 3165298 U | 1/2011 |
| JP | 2012-178723 A | 9/2012 |
| WO | 2009/078062 A1 | 6/2009 |

OTHER PUBLICATIONS

Communication dated Oct. 8, 2014 from the State Intellectual Property Office of People's Republic of China in counterpart application No. 201280049767.2.
Communication dated Jun. 26, 2015 from the European Patent Office in counterpart application No. 12843711.8.

* cited by examiner

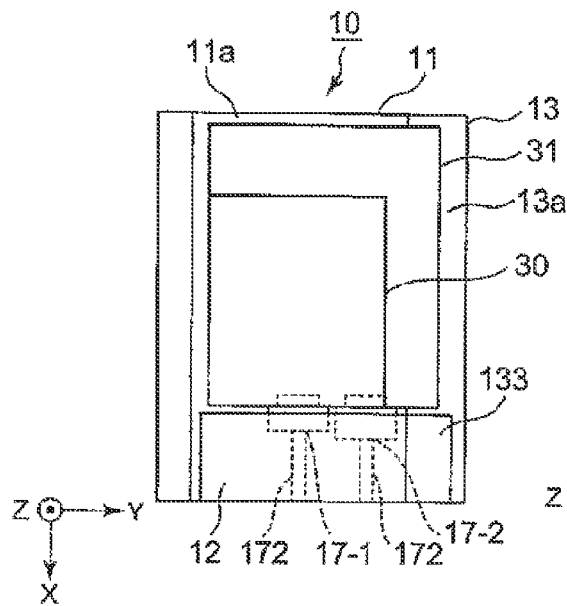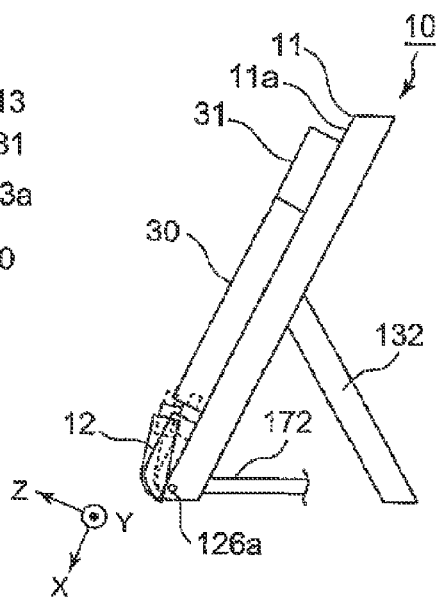
FIG. 1A  FIG. 1B
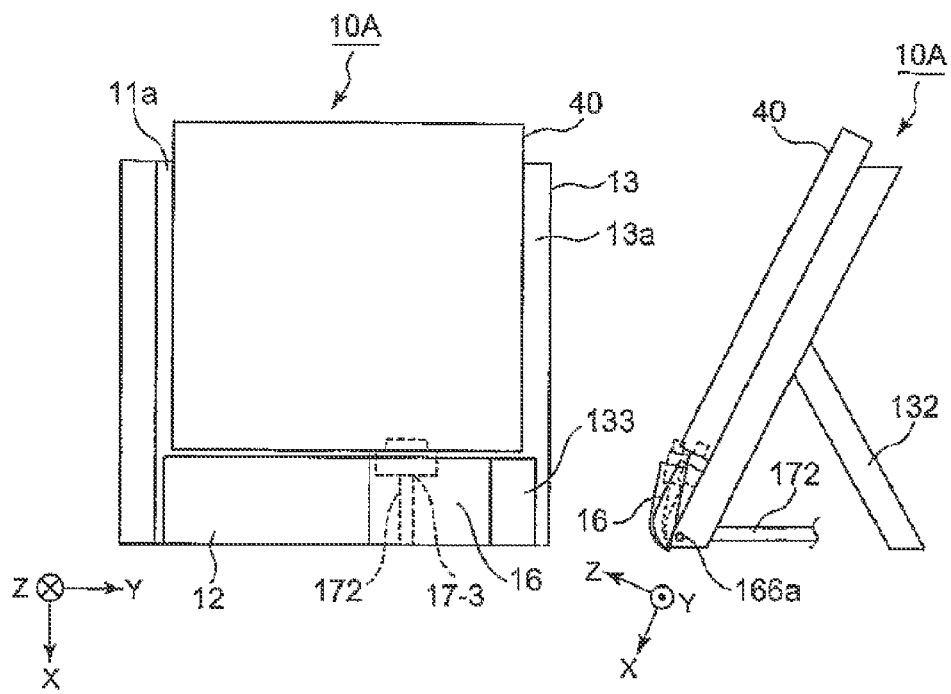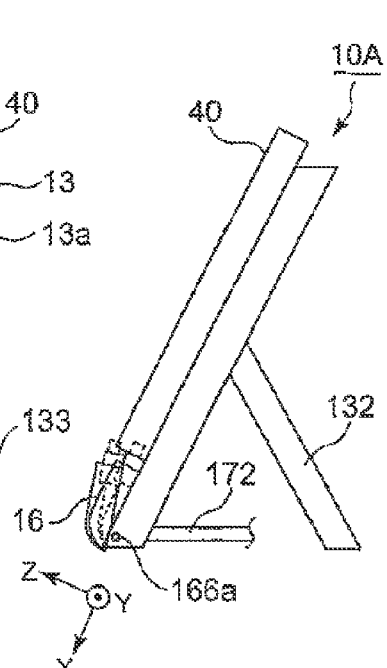
FIG. 2A  FIG. 2B

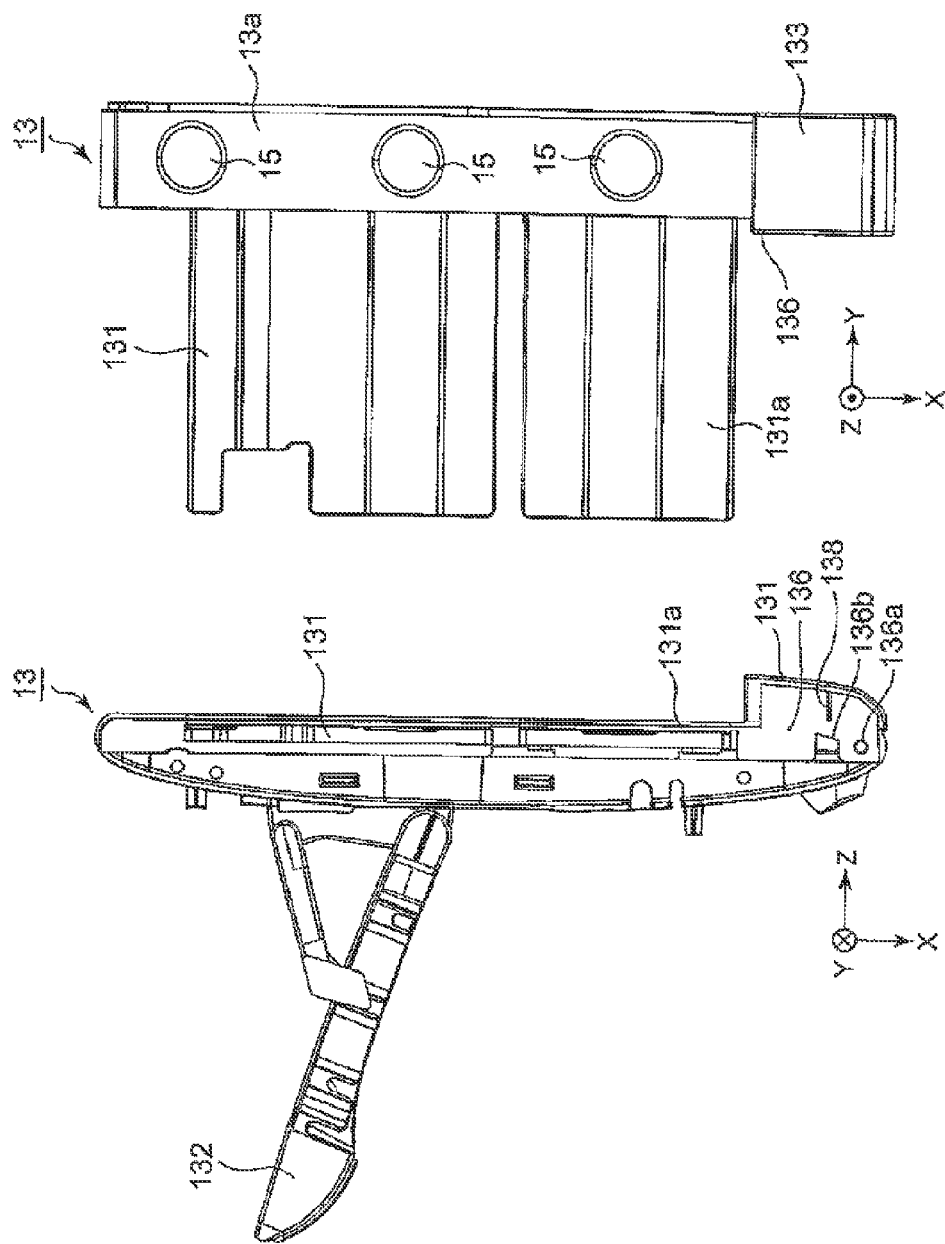

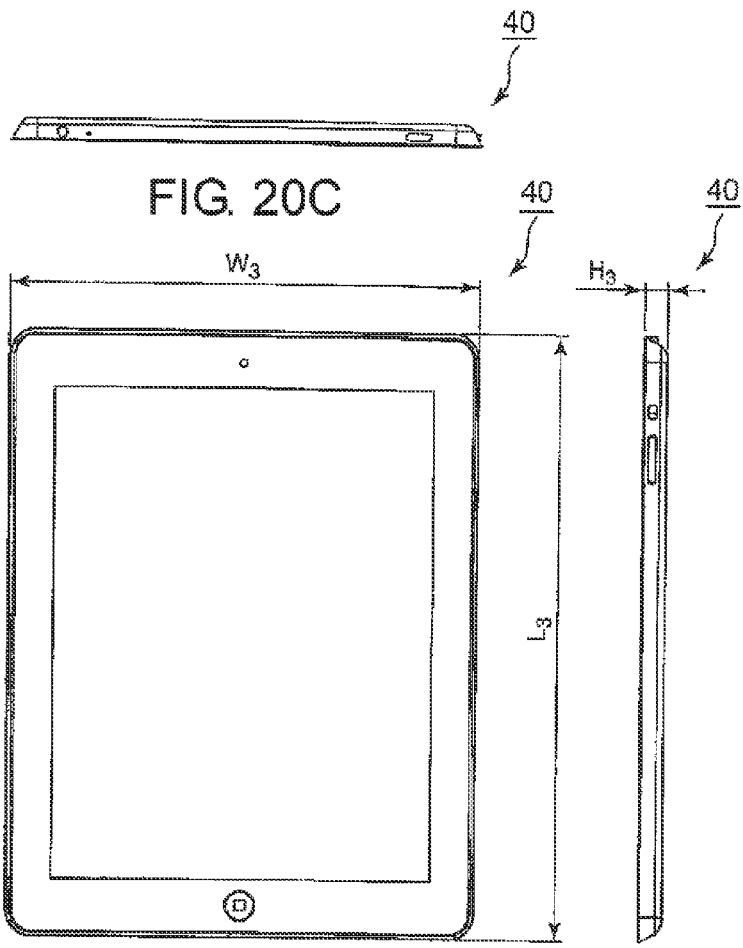
FIG. 20C
FIG. 20E  FIG. 20A  FIG. 20D
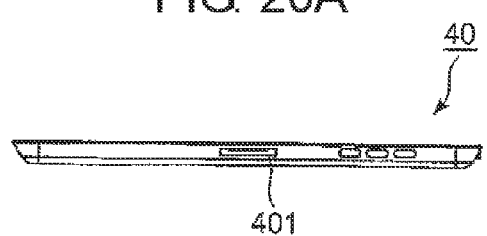
FIG. 20B

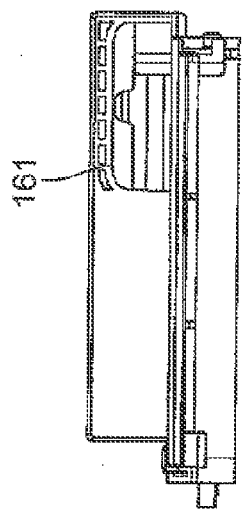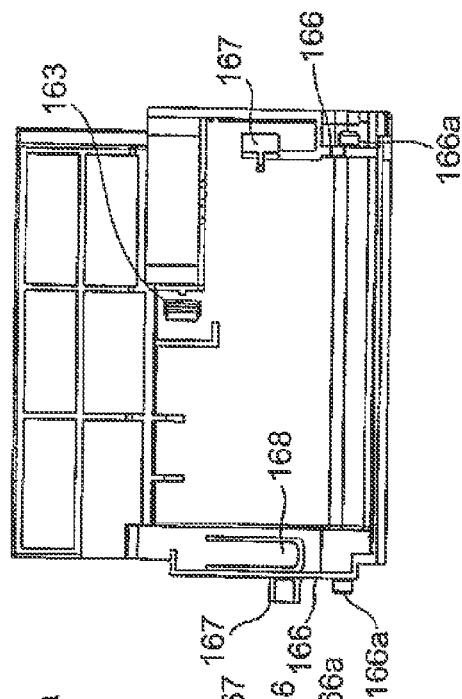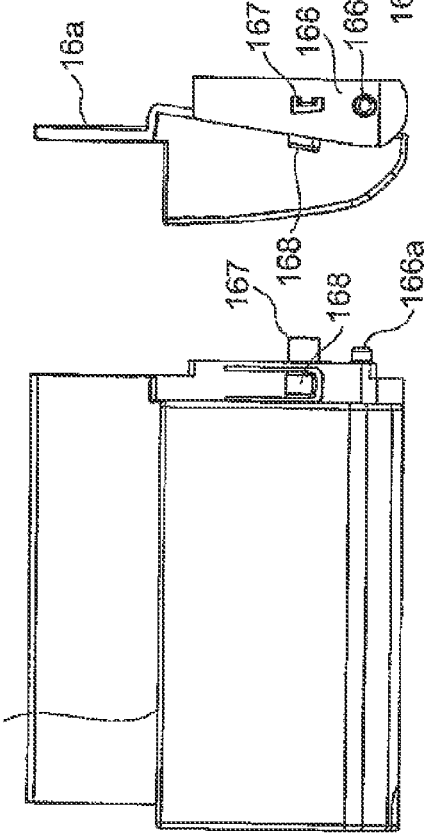

BATTERY-CHARGING BASE FOR MOBILE INFORMATION TERMINALS

CROSS REFERENCE TO RELATED APPLICATIONS

This application is a National Stage of International Application No. PCT/JP2012/076373 filed Oct. 4, 2012, claiming priority based on Japanese Patent Application No. 2011-232514 filed Oct. 24, 2011, the contents of all of which are incorporated herein by reference in their entirety

TECHNICAL FIELD

This invention relates to a battery-charging base for a portable information terminal, which is capable of charging a portable information terminal such as a tablet terminal (multifunction portable terminal) and a smartphone (highly functional mobile phone) while holding the portable information terminal thereon.

BACKGROUND ART

Nowadays, various portable information terminals such as a tablet terminal (multifunction portable terminal) and a smartphone (highly functional mobile phone) are put on the market. iPad (trademark) is known as a typical example of the tablet terminal (multifunction portable terminal), and iPhone (trademark) is known as a typical example of the smartphone (highly functional mobile phone). Those various portable information terminals are different in length and width sizes and positions of battery-charging slots (battery-charging receptacle connectors) each provided at a lower end thereof As is well known, a battery charger is provided to each portable information terminal as an auxiliary part. The battery charger comprises a battery-charging plug connector, which is fixed to one end portion of a power supply cable, and an adapter with a plug, which is fixed to the other end portion of the power supply cable. To charge the portable information terminal, the plug of the adapter with a plug is generally inserted into a power outlet socket, and the battery-charging plug connector is inserted into the battery-charging slot (battery-charging receptacle connector) of the portable information terminal Thus, a secondary battery (such as a lithium ion battery) built into the portable information terminal can be charged.

Hitherto, on the other hand, various holding bases (battery-charging bases), which are capable of charging such portable information terminals while holding thereon those portable information terminals, have been proposed.

For example, WO 2009/078062 A (Patent Literature 1) discloses a holding base for holding a mobile phone in a removable manner. The holding base disclosed in Patent Literature 1 includes a bottom receiving section for supporting a bottom portion of the mobile phone, a back receiving section for supporting a back portion of the mobile phone, and arm sections for sandwiching and supporting both side surface portions of the mobile phone. In the mobile phone, battery-charging electrodes are provided at the bottom portion. The battery-charging electrodes are brought into contact with and electrically connected to power supply terminals of the holding base. A connector (battery-charging receptacle connector) is provided on a wall surface of a back surface portion of a holding base body, and this connector (battery-charging receptacle connector) is connected to the power supply terminals via a switch. When the mobile phone is mounted on the bottom receiving section, the switch is turned ON via a dog piece. When the switch is turned ON, electric power is supplied from the outside to the battery-charging power supply terminals via the connector (battery-charging receptacle connector). When a battery-charging power supply device (adapter) is connected to the connector (battery-charging receptacle connector) through a battery-charging cord (battery-charging plug connector with a power supply cable), electric power is supplied to the mobile phone, thereby being capable of charging the mobile phone.

Further, JP-A-H11-348677 (Patent Literature 2) discloses a mobile phone holder capable of holding mobile phones of various sizes and also connecting each of the mobile phones to a connector at the same time. The mobile phone holder disclosed in Patent Literature 2 includes a case, and a holder provided so as to be slidable on the case. A connector device and a case cover are provided on the case. Two sliders capable of sandwiching a phone and a holder cover for covering the sliders are provided on the holder. The case comprises a lower case section and an upper case section. A pair of guide members is provided on the case. A stopper that allows the phone to abut thereagainst and the pair of sliders for holding the phone are provided on the holder. The sliders include cams having inclined surfaces so that the sliders may be brought close to and away from each other by the guide members when the holder is slid. When the phone is mounted on the holder and brought into abutment against the stopper, and when the holder is slid, the sliders are brought close to each other due to actions of the cams and the guide members, thereby being capable of holding the phone and of fitting the connector (battery-charging receptacle connector) of the phone to the connector (battery-charging plug connector) of the connector device provided on the case.

Further, in Patent Literature 2, the connector device comprises a connector housing and a connector main body (battery-charging plug connector). The connector main body (battery-charging plug connector) is movable with respect to the connector housing by predetermined dimensions in an up-and-down direction and a right-and-left direction. The connector device is mounted to connector device support bars of the upper case section, and fixed thereto with screws. The connector device is covered with the case cover.

On the other hand, JP-A-2006-172371 (Patent Literature 3) discloses an electronic device having a removable unit accommodating structure for easily mounting and removing a removable unit, though the device is not a holding base (battery-charging base). In Patent Literature 3, an HDD accommodating section is provided in a main body of a notebook computer (electronic device). An HDD serving as the removable unit is removably accommodated in the HDD accommodating section. A connector section and a connector fixed to the connector section are provided in the HDD accommodating section. Rotation shafts are provided on both side portions of the connector section, and the connector section is rotatable about the rotation shafts between an upright position and an accommodation position. The connector section and the connector are freely rotatable between the upright position and the accommodation position.

CITATION LIST

Patent Literature

Patent Literature 1: WO 2009/078062 A
Patent Literature 2: JP-A-H11-348677

Patent Literature 3: JP-A-2006-172371

SUMMARY OF THE INVENTION

Problems to be Solved by the Invention

Patent Literatures 1 and 2 have the following problems.

In the holding base disclosed in Patent Literature 1, there is a problem in that the holding base is capable of holding only one type of mobile phone having predefined dimensions. Further, in Patent Literature 1, the battery-charging receptacle connector is provided on the wall surface of the back surface portion of the holding base body. Therefore, in the holding base disclosed in Patent Literature 1, a large number of components such as the power supply terminals, the switch, and the dog piece need to be provided, and hence there is another problem in that the structure becomes complicated.

In the mobile phone holder disclosed in Patent Literature 2, on the other hand, the mobile phone is held by the pair of sliders, and hence mobile phones slightly different in dimensions can only be held within the movable range of the sliders. Further, in the mobile phone holder disclosed in Patent Literature 2, the connector device is fixed to the connector device support bars of the upper case section with screws, and hence the chargeable mobile phone is limited to a mobile phone having a battery-charging receptacle connector (battery-charging slot) located at a predetermined (fixed) position. In other words, the mobile phone holder disclosed in Patent Literature 2 is not adaptable to portable information terminals such as a tablet terminal (multifunction portable terminal) and a smartphone (highly functional mobile phone), which are different in length and width sizes and positions of battery-charging receptacle connectors (battery-charging slots).

Further, in the structure disclosed in Patent Literature 2, it is easy to connect the connector (battery-charging receptacle connector) of the phone to the connector (battery-charging plug connector) of the connector device provided on the case, but is difficult to disconnect the battery-charging receptacle connector from the battery-charging plug connector.

On the other hand, Patent Literature 3 merely discloses the structure in which the connector section and the connector are freely rotatable between the upright position and the accommodation position. In Patent Literature 3, the connector section and the connector are coupled to each other at fixed positions defined in advance, and the connection positions therebetween cannot be changed. Thus, even the removable unit accommodating structure disclosed in Patent Literature 3 is only capable of easily mounting and removing one type of removable units (HDD) each having a length and width size fixed (defined) in advance.

It is therefore an object of this invention to provide a battery-charging base for a portable information terminal, which is capable of easily connecting and disconnecting, to and from a battery-charging plug connector housed in a holding base, a battery-charging receptacle connector (battery-charging slot) of one of a plurality of types of portable information terminals that are different in length and width sizes and positions of battery-charging receptacle connectors (battery-charging slots).

Means to Solve the Problems

According to the present invention, there is provided a battery-charging base for a portable information terminal, which is capable of holding one of a plurality of types of portable information terminals that are different in length and width sizes and positions of battery-charging slots provided at a lower end portion thereof, and of charging the held one of the plurality of types of portable information terminals by inserting a battery-charging plug connector into the battery-charging slot of the held one of the plurality of types of portable information terminals, the battery-charging base including: a holding base main body for holding the one of the plurality of types of portable information terminals on a main mounting surface inclined with respect to a horizontal surface; and a battery-charging cover including a first housing section capable of housing the battery-charging plug connector while changing a housing position thereof, the battery-charging cover being fixed to a lower end of the main mounting surface in a freely removable manner, the battery-charging cover being configured to support the lower end of the one of the plurality of types of portable information terminals to be held on the main mounting surface, the battery-charging cover being rotatable about a first rotation axis provided at a lower end portion thereof

Advantageous Effect of the Invention

According to the present invention, it is possible to easily connect and disconnect, to and from the battery-charging plug connector, the battery-charging slot of the one of the plurality of types of portable information terminals that are different in length and width sizes and positions of the battery-charging slots.

BRIEF DESCRIPTION OF THE DRAWINGS

FIGS. 1A and 1B are a schematic plan view and a schematic right-hand side view, respectively, illustrating a battery-charging base for a portable information terminal according to a first exemplary embodiment of this invention;

FIGS. 2A and 2B are a schematic plan view and a schematic right-hand side view, respectively, illustrating a battery-charging base for a portable information terminal according to a second exemplary embodiment of this invention;

FIGS. 19A and 19B are a plan view and a left-hand side view, respectively, illustrating the extensible holding member removed from the battery-charging base for a portable information terminal illustrated in FIG. 16;

FIGS. 20A to 20E are a front view, a bottom view, a top view (plan view), a right-hand side view, and a left-hand side view, respectively, illustrating a third portable information terminal having the maximum length and width size, which is to be charged while being held on the battery-charging base for a portable information terminal illustrated in FIG. 17;

FIGS. 21A to 21D are a front view, a top view, a rear view, and a right-hand side view, respectively, illustrating the expansion battery-charging cover to be used in the battery-charging base for a portable information terminal illustrated in FIG. 17;

MODE FOR EMBODYING THE INVENTION

Figure 3:
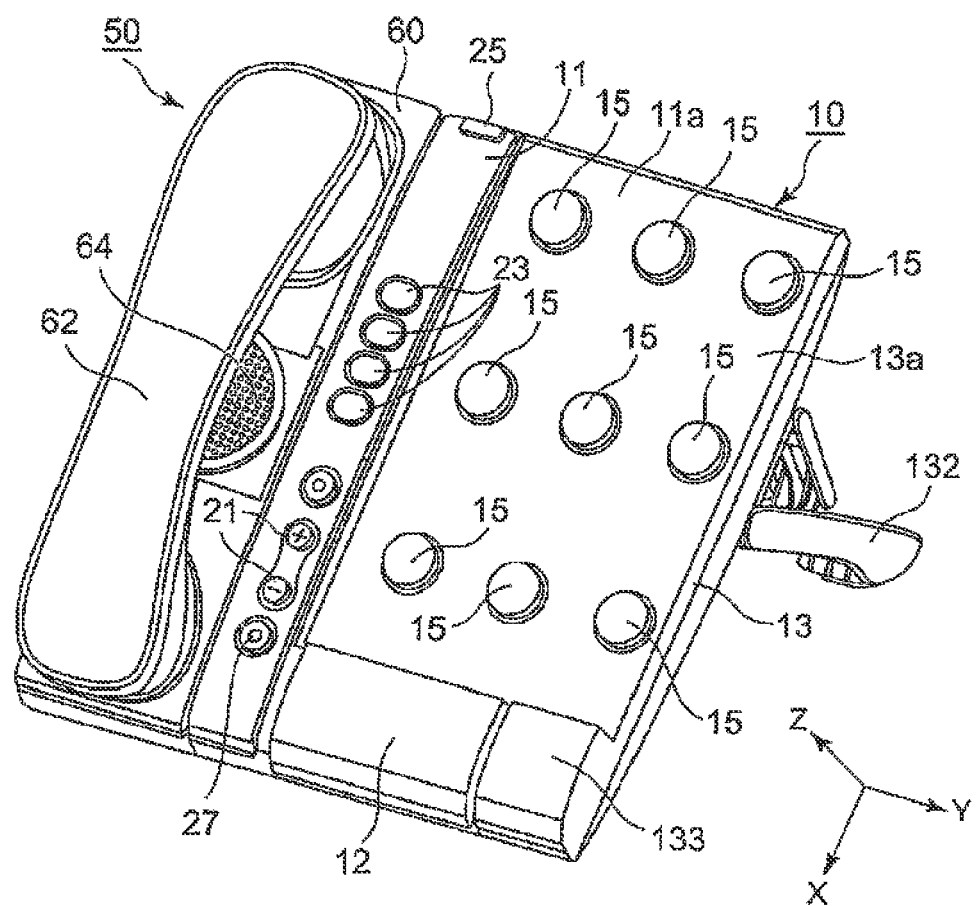
FIG. 3 is a perspective view illustrating a battery-charging base for a portable information terminal according to a first example of this invention under a state in which a side plate is removed.

Now, exemplary embodiments of this invention are described in detail with reference to the drawings.
(First Exemplary Embodiment)

Referring to FIGS. 1A and 1B, the description will proceed to a battery-charging base 10 for a portable information device according to a first exemplary embodiment of this invention. FIG. 1A is a schematic plan view illustrating the battery-charging base 10 for a portable information terminal, and FIG. 1B is a schematic right-hand side view illustrating the battery-charging base 10 for a portable information terminal The illustrated battery-charging base 10 for a portable information terminal is a battery-charging base capable of holding one of a plurality of types of portable information terminals that are different in length and width sizes and positions of battery-charging slots provided at a lower end thereof, and of charging the held portable information terminal by inserting a battery-charging plug connector into the battery-charging slot of the held portable information terminal The plurality of types of portable information terminals to be held and charged on the illustrated battery-charging base 10 for a portable information terminal at least include a first portable information terminal 30 having a first length and width size and a first battery-charging slot, and a second portable information terminal 31 having a second length and width size larger than the first length and width size and a second battery-charging slot provided at a position different from that of the first battery-charging slot.

The illustrated battery-charging base 10 for a portable information terminal includes a holding base main body 11 having a main mounting surface 11a inclined at a predetermined angle with respect to a horizontal surface such as a desk. The holding base main body 11 includes a leg (shown) on its back surface, for supporting the holding base main body 11. Thus, the leg allows the main mounting surface 11a to be inclined at the predetermined angle with respect to the horizontal surface.

As illustrated in FIGS. 1A and 1B, a Cartesian coordinate system (X,Y,Z) is used herein. In the state illustrated in FIGS. 1A and 1B, in the Cartesian coordinate system (X,Y,Z), the X-axis direction refers to a fore-and-aft direction (depth direction) extending parallel to the main mounting surface 11a, the Y-axis direction refers to a right-and-left direction (width direction) extending parallel to the main mounting surface 11a and orthogonal to the X-axis direction, and the Z-axis direction refers to an up-and-down direction (height direction) orthogonal to the main mounting surface 11a.

First and second battery-charging plug connectors 17-1 and 17-2 are provided to the first and second portable information terminals 30 and 31, respectively, as auxiliary parts. Each of the first and second battery-charging plug connectors 17-1 and 17-2 is fixed to one end portion of a power supply cable 172.

The battery-charging base 10 for a portable information terminal includes a battery-charging cover 12 to be fixed to a lower end of the main mounting surface 11a in a freely removable manner. As illustrated in FIG. 1A, the battery-charging cover 12 includes a first housing section capable of housing one of the first and second battery-charging plug connectors 17-1 and 17-2 while changing a housing position thereof Thus, the first battery-charging plug connector 17-1 or the second battery-charging plug connector 17-2 is fixed to the first housing section of the battery-charging cover 12. The battery-charging cover 12 is configured to support a lower end of one of the plurality of types of portable information terminals 30 and 31 to be held on the main mounting surface 11a. As illustrated in FIG. 1B, the battery-charging cover 12 is rotatable about a first rotation axis 126a provided at a lower end portion thereof.

The battery-charging base 10 for a portable information terminal includes an extensible holding member 13 provided on a first side edge portion side (in the example of the figures, on a right edge portion side) of the holding base main body 11. The extensible holding member 13 has an extensible mounting surface 13a extending in parallel to (on the same plane as) the main mounting surface 11a. The extensible holding member 13 includes a leg 132 similar to the above-mentioned leg of the holding base main body 11 on a back surface of the extensible holding member 13. Thus, the leg 132 allows the extensible mounting surface 13a to be inclined at a predetermined angle with respect to the horizontal surface. The extensible holding member 13 includes a stopper 133 for supporting the lower end of the second portable information device 31.

As described above, the battery-charging cover 12 has the structure in which the battery-charging cover 12 is rotatable about the first rotation axis 126a, and hence it is possible to easily mount and remove one of the first and second portable information terminals 30 and 31. Specifically, when the first and second portable information terminals 30 and 31 are to be connected to and disconnected from the first and second battery-charging plug connectors 17-1 and 17-2, respectively, no unreasonable force is applied to the first and second battery-charging plug connectors 17-1 and 17-2 themselves. Thus, damage to the first and second battery-charging plug connectors 17-1 and 17-2 can be prevented.

(Second Exemplary Embodiment)

Referring to FIGS. 2A and 2B, the description will proceed to a battery-charging base 10A for a portable information terminal according to a second exemplary embodiment of this invention. FIG. 2A is a schematic plan view illustrating the battery-charging base 10A for a portable information terminal, and FIG. 2B is a schematic right-hand side view illustrating the battery-charging base 10A for a portable information terminal The illustrated battery-charging base 10A for a portable information terminal has a similar configuration to that of the battery-charging base 10 for a portable information terminal illustrated in FIGS. 1 except that the extensible holding member 13 is changed so as to be slidable as described later and an expansion battery-charging cover 16 is further provided. Thus, components having similar functions to those illustrated in FIGS. 1 are represented by the same reference symbols, and only differences are therefore described below.

As illustrated in FIGS. 2A and 2B, a Cartesian coordinate system (X,Y,Z) is also used herein. In the state illustrated in FIGS. 2A and 2B, in the Cartesian coordinate system (X,Y,Z), the X-axis direction refers to a fore-and-aft direction (depth direction) extending parallel to the main mounting surface 11a, the Y-axis direction refers to a right-and-left direction (width direction) extending parallel to the main mounting surface 11a and orthogonal to the X-axis direction, and the Z-axis direction refers to an up-and-down direction (height direction) orthogonal to the main mounting surface 11a.

The plurality of types of portable information terminals to be held and charged on the illustrated battery-charging base 10A for a portable information device further include a third portable information terminal 40 having a third length and width size larger than the second length and width size and a third battery-charging slot provided at a position different from that of the first and second battery-charging slots.

A third battery-charging plug connector 17-3 is provided to the third portable information terminal 40 as an auxiliary part. The third battery-charging plug connector 17-3 is fixed to one end portion of the power supply cable 172.

The extensible holding member 13 includes a slide plate that is slidable inside the holding base main body 11. The extensible mounting surface 13a is movable in parallel to (on the same plane as) the main mounting surface 11a. When the extensible holding member 13 is extended to a predetermined extension position, the stopper 133 of the extensible holding member 13 supports a lower end of the third portable information terminal 40.

The expansion battery-charging cover 16 is fixed, in a freely removable manner, to a lower end of the slide plate at a position between the main mounting surface 11a and the extensible mounting surface 13a under the state in which the extensible holding member 13 is extended to the predetermined extension position. The expansion battery-charging cover 16 includes a second housing section capable of housing the third battery-charging plug connector 17-3. Thus, the third battery-charging plug connector 17-3 is fixed to the second housing section of the expansion battery-charging cover 16. The expansion battery-charging cover 16 is configured to support the lower end of the third portable information device 40, and is rotatable about a second rotation axis 166a provided at a lower end portion thereof.

As described above, the expansion battery-charging cover 16 has the structure in which the expansion battery-charging cover 16 is rotatable about the second rotation axis 166a, and hence it is possible to easily mount and remove the third portable information terminal 40. Specifically, when the third portable information terminal 40 is to be connected to and disconnected from the third battery-charging plug connector 17-3, no unreasonable force is applied to the third battery-charging plug connector 17-3 itself. Thus, damage to the third battery-charging plug connector 17-3 can be prevented.

EXAMPLE 1

Figure 4:
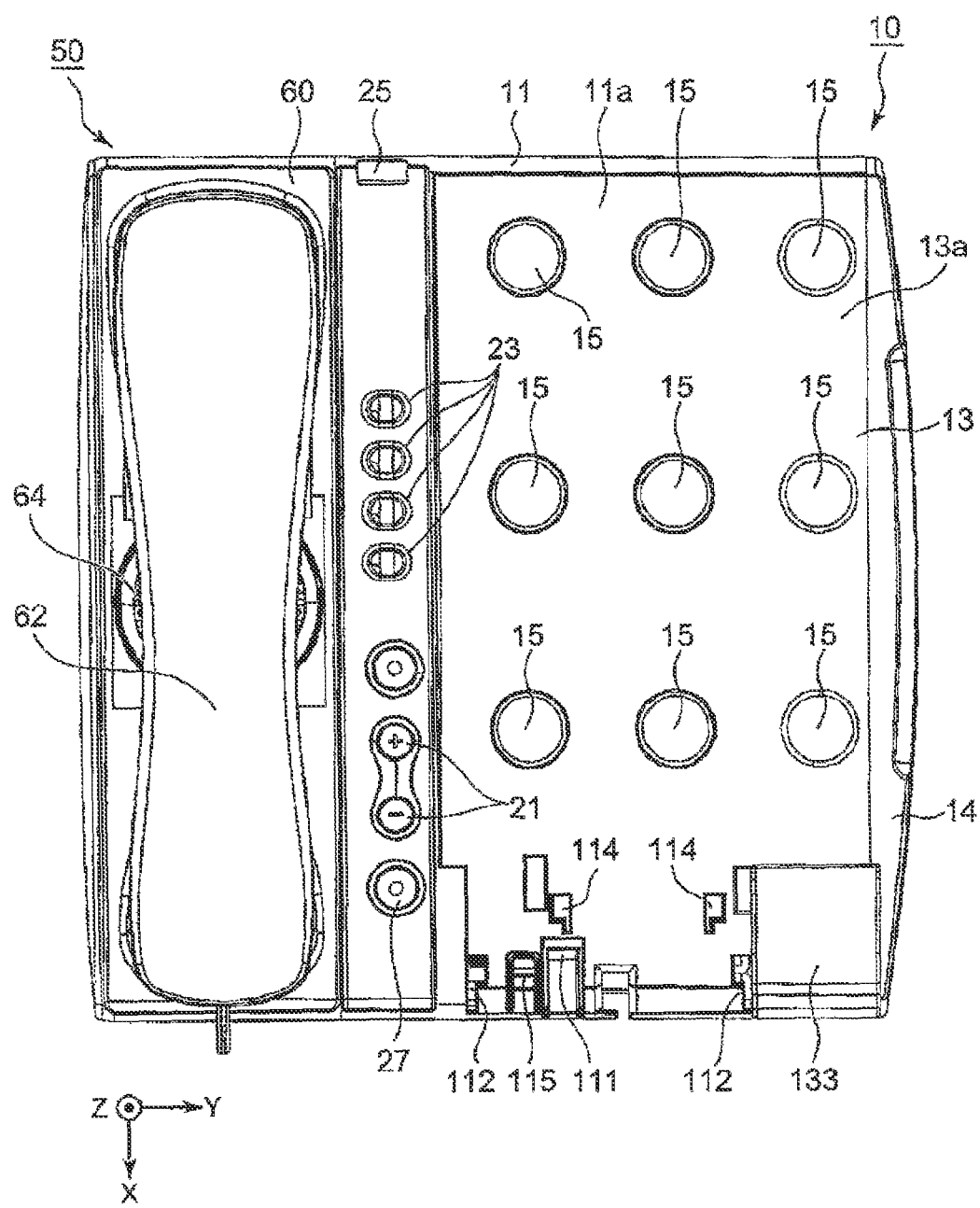
FIG. 4 is a plan view illustrating the battery-charging base for a portable information terminal illustrated in FIG. 3 under a state in which a battery-charging cover is removed.
Figure 5:
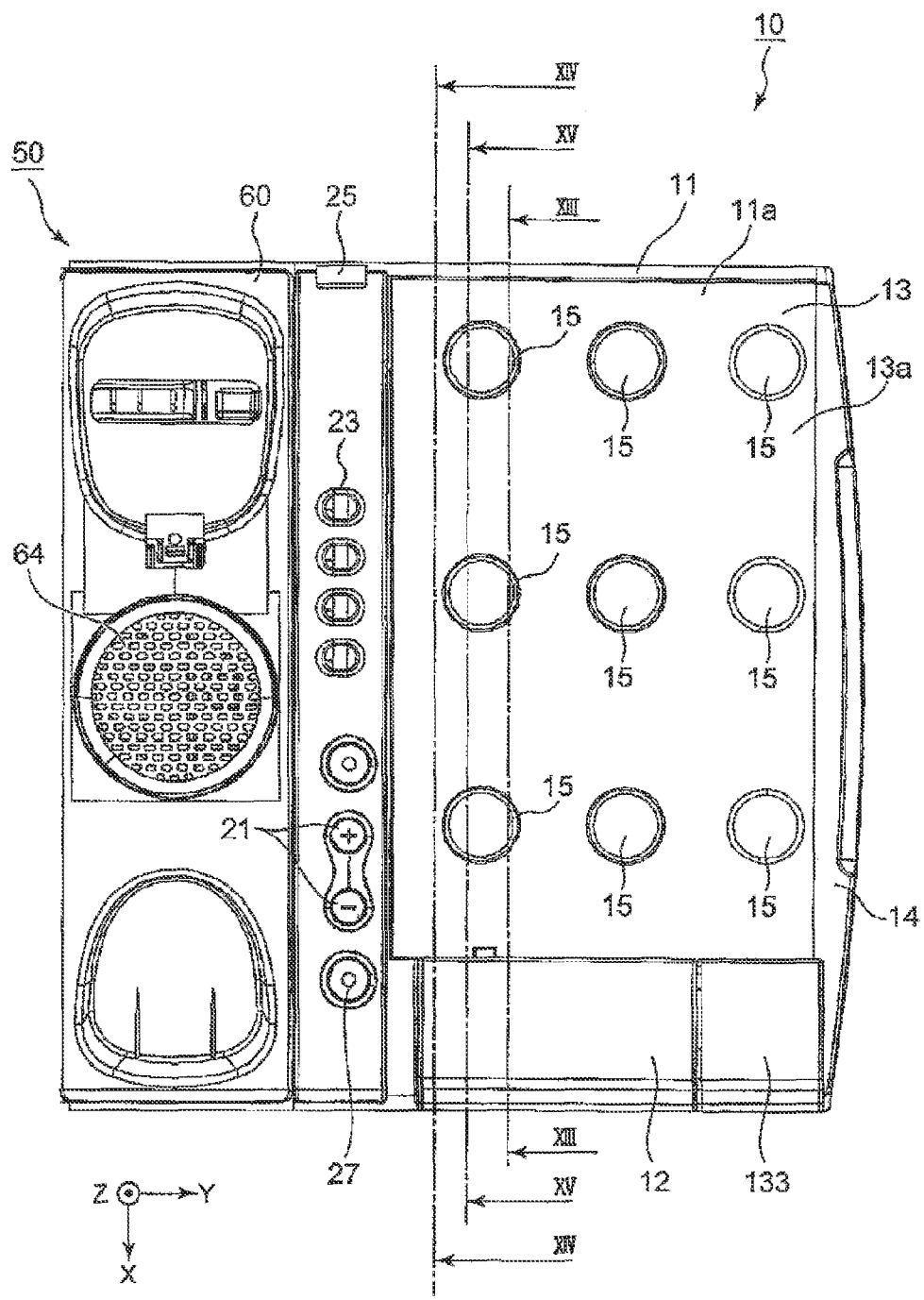
FIG. 5 is a plan view illustrating the battery-charging base for a portable information terminal illustrated in FIG. 3 under a state in which a handset is removed.

Referring to FIGS. 3 to 5, the description will proceed to a battery-charging base 10 for a portable information terminal according to a first example of this invention. FIG. 3 is a perspective view illustrating the battery-charging base 10 for a portable information terminal under a state in which a side plate 14 is removed. FIG. 4 is a plan view illustrating the battery-charging base 10 for a portable information terminal under a state in which a battery-charging cover 12 is removed. FIG. 5 is a plan view illustrating the battery-charging base 10 for a portable information terminal under a state in which a handset 62 is removed.

The illustrated battery-charging base 10 for a portable information terminal includes a holding base main body 11 having a main mounting surface 11a inclined at a predetermined angle with respect to a horizontal surface such as a desk. The holding base main body 11 includes a leg (shown) on its back surface, for supporting the holding base main body 11. Thus, the leg allows the main mounting surface 11a to be inclined at the predetermined angle with respect to the horizontal surface.

As illustrated in FIGS. 3 to 5, a Cartesian coordinate system (X,Y,Z) is used herein. In the state illustrated in FIGS. 3 to 5, in the Cartesian coordinate system (X,Y,Z), the X-axis direction refers to a fore-and-aft direction (depth direction) extending parallel to the main mounting surface 11a, the Y-axis direction refers to a right-and-left direction (width direction) extending parallel to the main mounting surface 11a and orthogonal to the X-axis direction, and the Z-axis direction refers to an up-and-down direction (height direction) orthogonal to the main mounting surface 11a.

The illustrated battery-charging base 10 for a portable information terminal is a battery-charging base capable of holding one of two types of portable information terminals including a first portable information terminal 30 (see FIG. 6A) having a first length and width size and a first battery-charging slot (described later), and a second portable information terminal 31 (see FIG. 7A) having a second length and width size larger than the first length and width size and a second battery-charging slot (described later) provided at a position different from that of the first battery-charging slot, and of charging the held portable information terminal by inserting a battery-charging plug connector (described later) into the battery-charging slot of the held portable information terminal.

In the example being illustrated, the first portable information terminal 30 is a smartphone (highly functional mobile phone) such as iPhone having a 4-inch screen, and the second portable information terminal 31 is a tablet terminal (multifunction portable terminal) such as Galaxy Tab having a 7-inch screen.

Figure 6C:
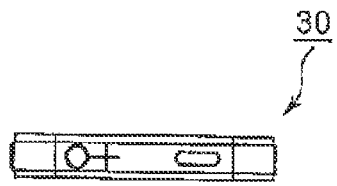
FIGS. 6A to 6E are a front view, a bottom view, a top view (plan view), a right-hand side view, and a left-hand side view, respectively, illustrating a first portable information terminal having the minimum length and width size, which is to be charged while being held on the battery-charging base for a portable information terminal illustrated in FIGS. 3 to 5.
Figures 6A, 6D, 6E:
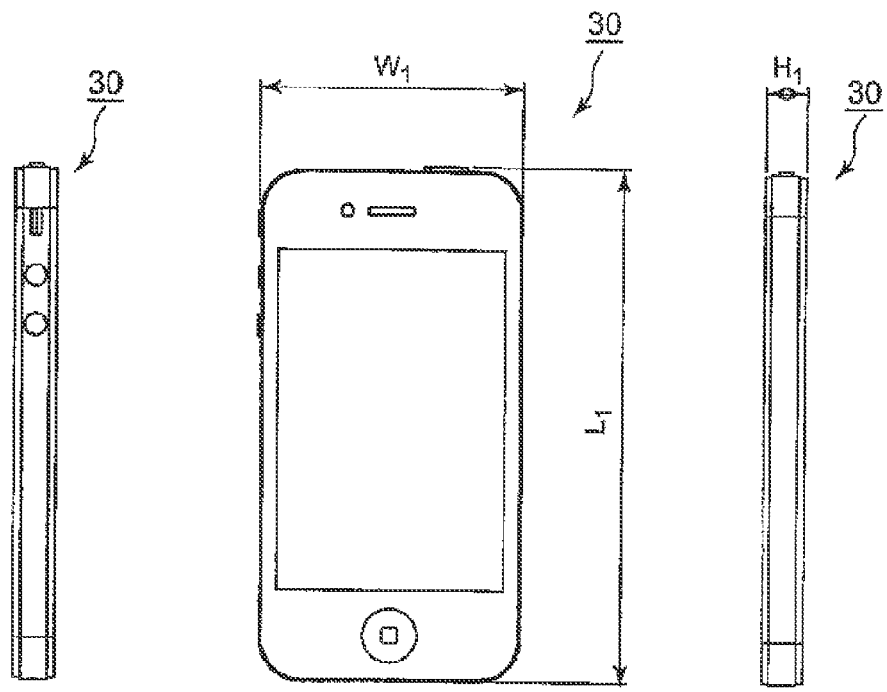
Figure 6B:
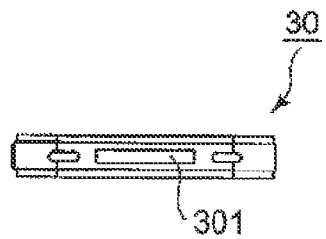

FIGS. 6A to 6E are views illustrating the first portable information terminal 30. FIG. 6A is a front view illustrating the first portable information terminal 30. FIG. 6B is a bottom view illustrating the first portable information terminal 30. FIG. 6C is a top view (plan view) illustrating the first portable information terminal 30. FIG. 6D is a right-hand side view illustrating the first portable information terminal 30. FIG. 6E is a left-hand side view illustrating the first portable information terminal 30.

As illustrated in FIGS. 6A and 6D, the first portable information terminal 30 has dimensions or sizes of a first length $L_1$, a first width $W_1$, and a first height $H_1$. In the example being illustrated, the first length $L_1$ is 116 mm, the first width $W_1$ is 59 mm, and the first height $H_1$ is 9.3 mm. Further, as illustrated in FIG. 6B, a first battery-charging slot (first battery-charging receptacle connector) 301 is provided at a lower end of the first portable information terminal 30. The first portable information terminal 30 has the minimum length and width size.

Figure 7C:
FIGS. 7A to 7E are a front view, a bottom view, a top view (plan view), a right-hand side view, and a left-hand side view, respectively, illustrating a second portable information terminal to be charged while being held on the battery-charging base for a portable information terminal illustrated in FIGS. 3 to 5.
Figures 7A, 7D, 7E:
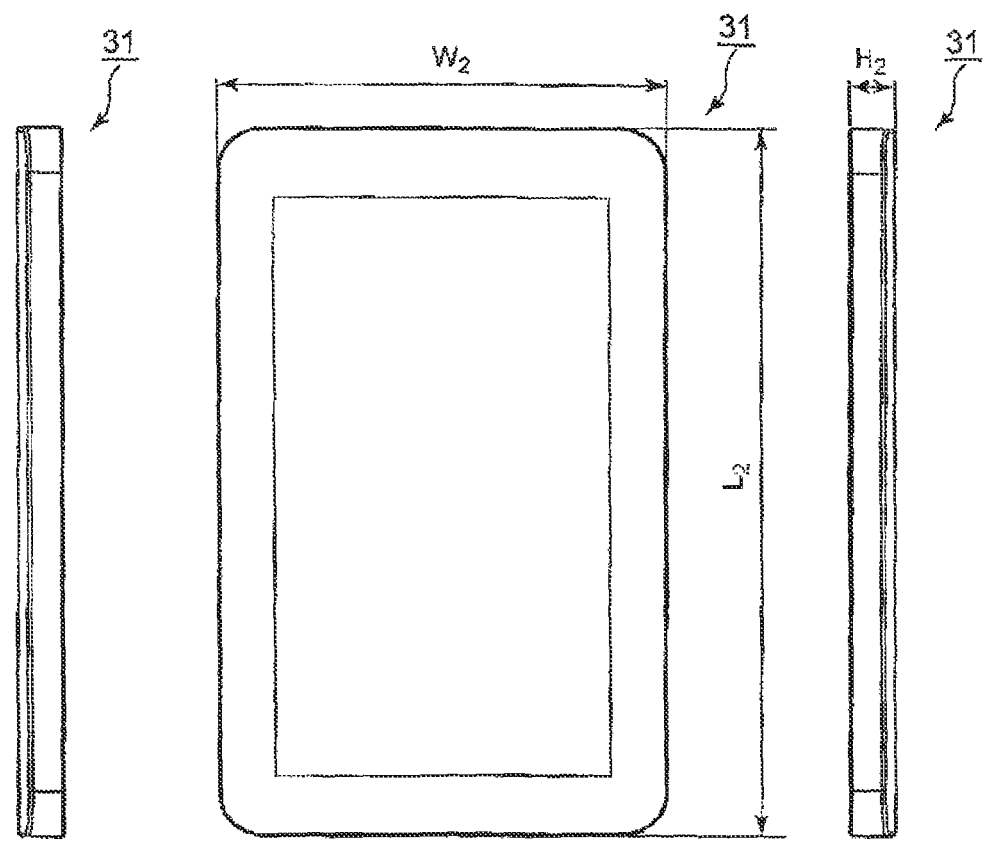
Figure 7B:
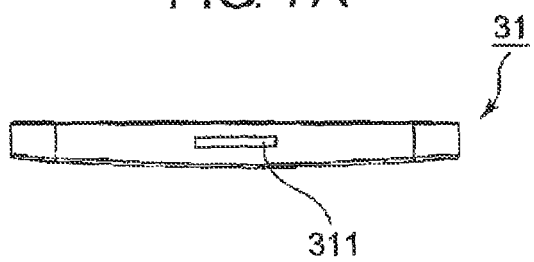

FIGS. 7A to 7E are views illustrating the second portable information terminal 31. FIG. 7A is a front view illustrating the second portable information terminal 31. FIG. 7B is a bottom view illustrating the second portable information terminal 31. FIG. 7C is a top view (plan view) illustrating the second portable information terminal 31. FIG. 7D is a right-hand side view illustrating the second portable information terminal 31. FIG. 7E is a left-hand side view illustrating the second portable information terminal 31.

As illustrated in FIGS. 7A and 7D, the second portable information terminal 31 has dimensions or sizes of a second length $L_2$, a second width $W_2$, and a second height $H_2$. In the example being illustrated, the second length $L_2$ is 190 mm, the second width $W_2$ is 120 mm, and the second height $H_2$ is 12.2 mm. Further, as illustrated in FIG. 7B, a second battery-charging slot (second battery-charging receptacle connector) 311 is provided at a lower end of the second portable information terminal 31.

Referring back to FIGS. 3 to 5, the battery-charging base 10 for a portable information terminal includes the battery-charging cover 12 to be fixed to a lower end of the main mounting surface 11a in a freely removable manner. FIG. 3 illustrates a state in which the battery-charging cover 12 is fixed to the lower end of the main mounting surface 11 a. The battery-charging cover 12 is configured to support a lower end of one of the above-mentioned two types of portable information terminals 30 and 31 to be held on the main mounting surface 11a.

As described above, first and second battery-charging plug connectors 17-1 and 17-2 (see FIGS. 10A and 11A) are provided to the first and second portable information terminals 30 and 31, respectively, as auxiliary parts. Each of the first and second battery-charging plug connectors 17-1 and 17-2 is fixed to one end portion of a power supply cable 172.

As described later, the battery-charging cover 12 includes a first housing section capable of housing one of the first and second battery-charging plug connectors 17-1 and 17-2 while changing a housing position thereof The battery-charging cover 12 is configured to support the lower end of one of the two types of portable information terminals 30 and 31 to be held on the main mounting surface 11a. The battery-charging cover 12 is rotatable about a first rotation axis 126a (see FIG. 12C) provided at a lower end portion thereof The battery-charging base 10 for a portable information terminal includes an extensible holding member 13 provided on a first side edge portion side (in the example of the figures, on a right edge portion side) of the holding base main body 11. The extensible holding member 13 has an extensible mounting surface 13a extending in parallel to (on the same plane as) the main mounting surface 11a. The extensible holding member 13 includes a leg 132 similar to the above-mentioned leg of the holding base main body 11 on a back surface of the extensible holding member 13. Thus, the leg 132 allows the extensible mounting surface 13a to be inclined at a predetermined angle with respect to the horizontal surface. The extensible holding member 13 includes a stopper 133 for supporting the lower end of the second portable information terminal 31.

As illustrated in FIG. 4, a side plate 14 is removably arranged on a first side edge portion side (in the example of the figures, on a right edge portion side) of the extensible holding member 13.

The battery-charging base 10 for a portable information terminal further includes nine cushions 15 formed on the main mounting surface 11a and the extensible mounting surface 13a. In the example being illustrated, six cushions 15 are formed on the main mounting surface 11a and three cushions 15 are formed on the extensible mounting surface 13a.

In the example being illustrated, the battery-charging base 10 for a portable information terminal includes the nine cushions 15, but the cushions 15 are not limited to the nine cushions, and only need to be a plurality of cushions. However, it is preferred that the cushions 15 be arranged in matrix as illustrated in FIGS. 3 to 5.

Note that, the illustrated battery-charging base 10 for a portable information terminal includes volume buttons 21, a plurality of function buttons 23, an incoming call lamp 25, and a Bluetooth (trademark) module cooperation button 27 at a second side edge portion (in the example of the figures, at a left edge portion) of the holding base main body 11.

The illustrated battery-charging base 10 for a portable information device is combined integrally with a call receiver section 60 provided on the second side edge portion side (in the example of the figures, on the left edge portion side) of the holding base main body 11, to thereby serve as a desk phone 50. The call receiver section 60 includes a handset 62 and a loudspeaker 64.

Figure 8:
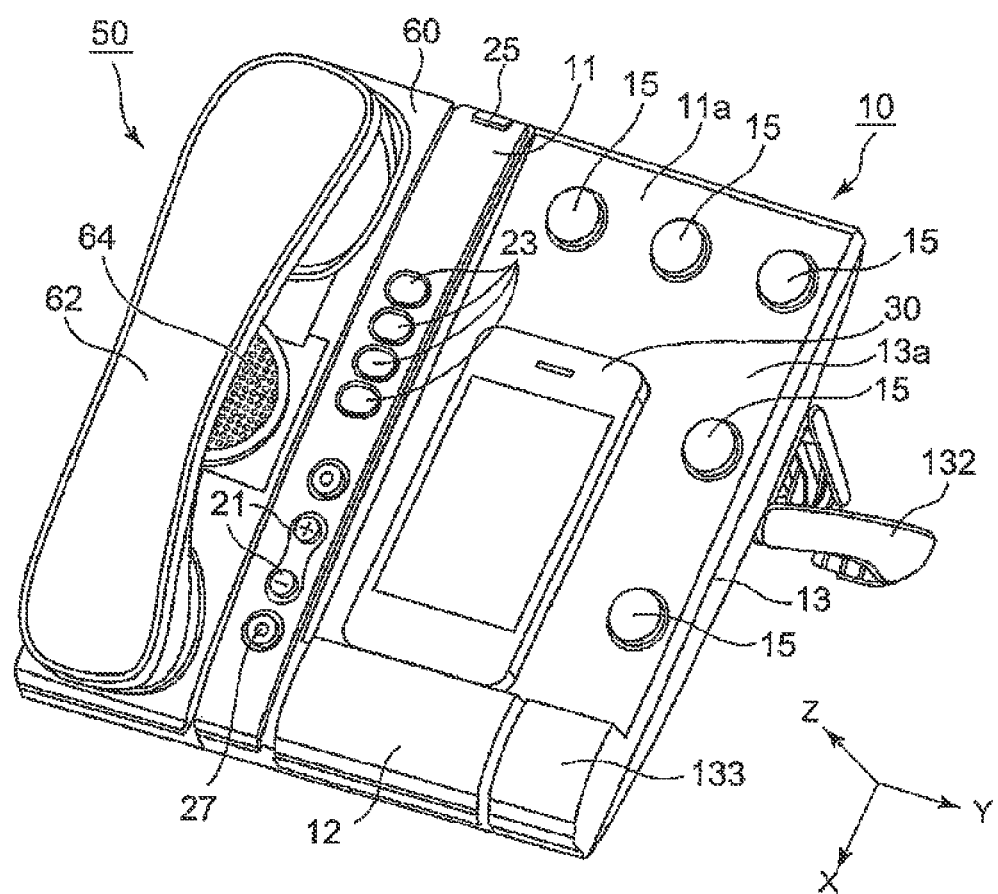
FIG. 8 is a perspective view illustrating a use state in which the first portable information terminal is held on the battery-charging base for a portable information terminal illustrated in FIG. 3.

Now, referring to FIG. 8, description is given of an example of an operation to be performed in the case where the first portable information terminal (smartphone) 30 is held on the main mounting surface 11*a* in the configuration in which the battery-charging base 10 for a portable information terminal and the call receiver section 60 are combined with each other (desk phone 50).

The first portable information terminal (smartphone) 30 has well-known Bluetooth installed thereon. On the other hand, the illustrated desk phone 50 has a Bluetooth module (not shown) installed thereon. Thus, when the Bluetooth module cooperation button 27 is depressed, the user can make phone conversations through use of the handset 62. In this case, the operation of making phone conversations is performed in the first portable information terminal (smartphone) 30.

Figure 9:
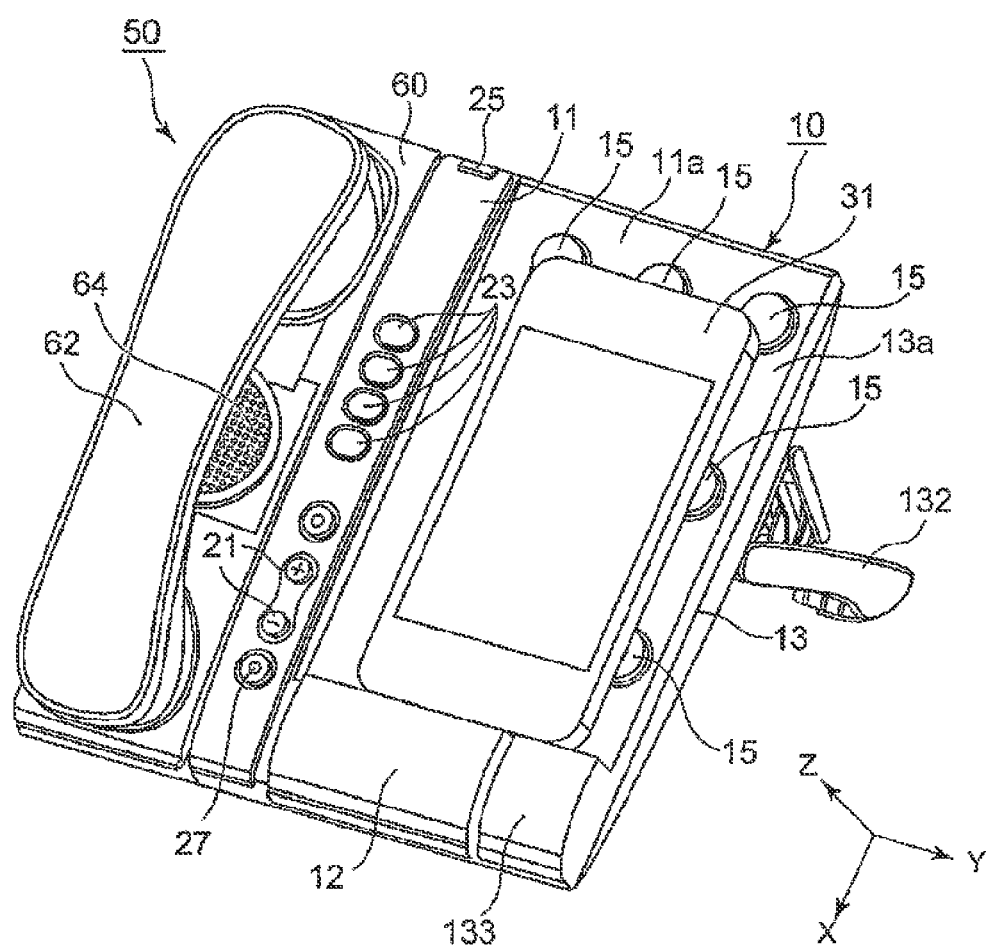
FIG. 9 is a perspective view illustrating a use state in which the second portable information terminal is held on the battery-charging base for a portable information terminal illustrated in FIG. 3.

As illustrated in FIG. 9, this operation of making phone conversations is also applicable to the case where the second portable information terminal (tablet terminal) 31 is held on the main mounting surface 11*a*.

Note that, the desk phone 50 itself can be used as an Internet Protocol (IP) phone compliant with the RFC-3261 protocol. That is, the desk phone 50 has a fixed number as the IP phone. However, the illustrated desk phone 50 does not include any dial button, and hence the desk phone 50 can only receive incoming calls.

Referring to FIGS. 10A to 10C and FIGS. 11A to 11C, description is given of an operation to be performed in a case where the first battery-charging plug connector 17-1 or the second battery-charging plug connector 17-2 is to be housed in and fixed to a first housing section 121 of the battery-charging cover 12.

Figure 10A:
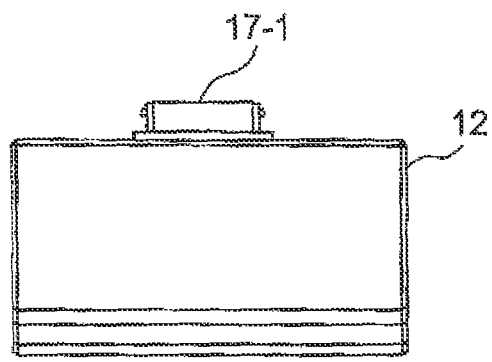
FIGS. 10A to 10C are a front view, a top view, and a rear view, respectively, illustrating a state in which a first battery-charging plug connector is fixed to the battery-charging cover to be used in the battery-charging base for a portable information terminal illustrated in FIGS. 3 to 5.
Figure 10B:
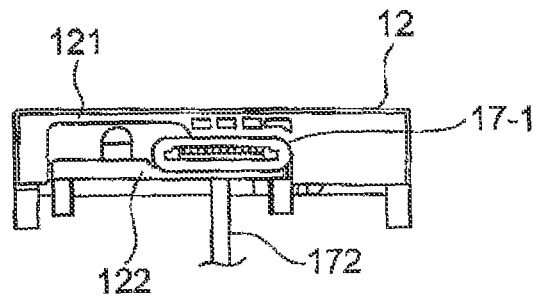
Figure 10C:
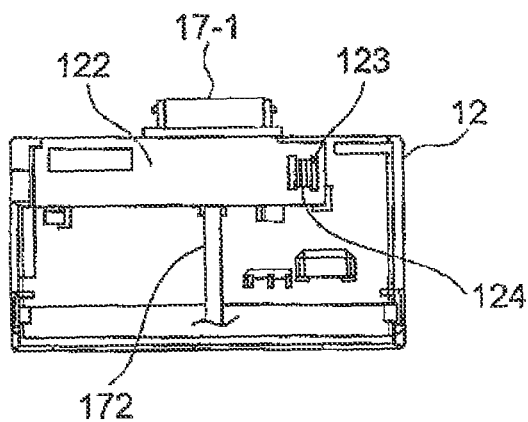

First, referring to FIGS. 10A to 10C, description is given of an operation to be performed in a case where the first battery-charging plug connector 17-1 is to be housed in and fixed to the first housing section 121 of the battery-charging cover 12. FIGS. 10A to 10C are a front view, a top view, and a rear view, respectively, illustrating a state in which the first battery-charging plug connector 17-1 is housed in and fixed to the first housing section 121 of the battery-charging cover 12.

As illustrated in FIGS. 10A to 10C, a latching claw 123 of the first housing section 121 is engaged with a latching hole 124 of a pressing plate 122, and thus the first battery-charging plug connector 17-1 is fixed to a first fixing position while being sandwiched between the first housing section 121 and the pressing plate 122. In the first example, the first battery-charging plug connector 17-1 is provided to the above-mentioned first portable information terminal (smartphone) 30 as an auxiliary part.

The first battery-charging plug connector 17-1 is connected to a power outlet socket through the power supply cable 172 and an adapter with a plug (not shown). On the other hand, as described above, the first portable information terminal (smartphone) 30 has the first battery-charging slot 301 (see FIG. 6B) provided at the lower end portion thereof so that the first battery-charging plug connector 17-1 is insertable thereinto. Thus, when the first battery-charging plug connector 17-1 is inserted into the first battery-charging slot 301 of the first portable information terminal (smartphone) 30, a secondary battery (lithium ion battery) built into the first portable information terminal (smartphone) 30 can be charged.

Figure 11A:
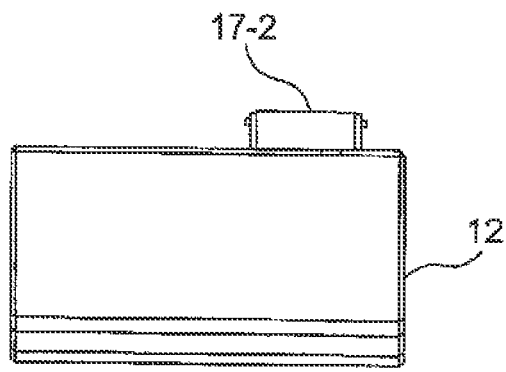
FIGS. 11A to 11C are a front view, a top view, and a rear view, respectively, illustrating a state in which a second battery-charging plug connector is fixed to the battery-charging cover to be used in the battery-charging base for a portable information terminal illustrated in FIGS. 3 to 5.
Figure 11B:
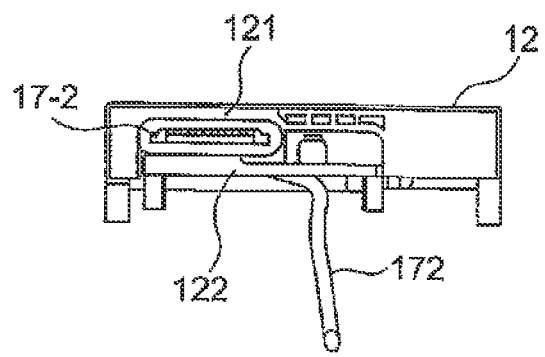
Figure 11C:
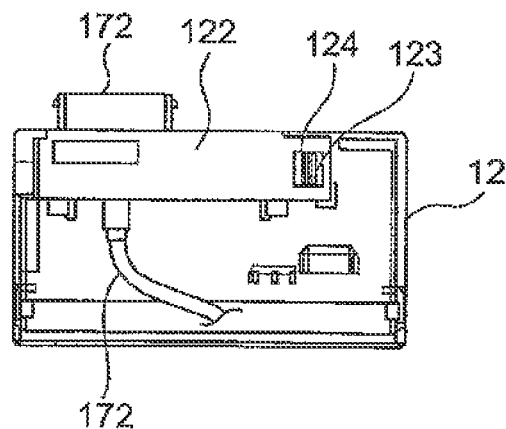

Next, referring to FIGS. 11A to 11C, description is given of an operation to be performed in a case where the second battery-charging plug connector 17-2 is to be housed in and fixed to the first housing section 121 of the battery-charging cover 12. FIGS. 11A to 11C are a front view, a top view, and a rear view, respectively, illustrating a state in which the second battery-charging plug connector 17-2 is housed in and fixed to the first housing section 121 of the battery-charging cover 12.

As illustrated in FIGS. 11A to 11C, the latching claw 123 of the first housing section 121 is engaged with the latching hole 124 of the pressing plate 122, and thus the second battery-charging plug connector 17-2 is fixed to a second fixing position while being sandwiched between the first housing section 121 and the pressing plate 122. In the first example, the second battery-charging plug connector 17-2 is provided to the above-mentioned second portable information terminal (tablet terminal) 31 as an auxiliary part.

The second battery-charging plug connector 17-2 is connected to a power outlet socket through the power supply cable 172 and an adapter with a plug (not shown). On the other hand, as described above, the second portable information terminal (tablet terminal) 31 has the second battery-charging slot 311 (see FIG. 7B) provided at the lower end portion thereof so that the second battery-charging plug connector 17-2 is insertable thereinto. Thus, when the second battery-charging plug connector 17-2 is inserted into the second battery-charging slot 311 of the second portable information terminal (tablet terminal) 31, a secondary battery (lithium ion battery) built into the second portable information terminal (tablet terminal) 31 can be charged.

Next, referring to FIGS. 12A to 12D to FIG. 15 as well as FIG. 4, description is given of a state in which the battery-charging cover 12 is fixed onto the main mounting surface 11*a* of the holding base main body 11.

Figure 12B:
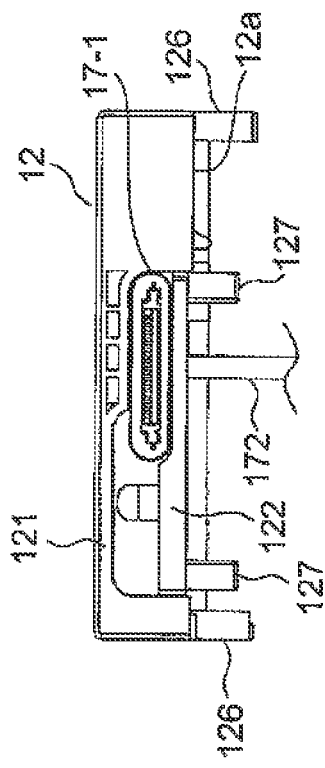
FIGS. 12A to 12D are a front view, a top view, a rear view, and a right-hand side view, respectively, illustrating a state in which the first battery-charging plug connector is housed in and fixed to a first housing section of the battery-charging cover illustrated in FIGS. 10A to 10C.
Figure 12C:
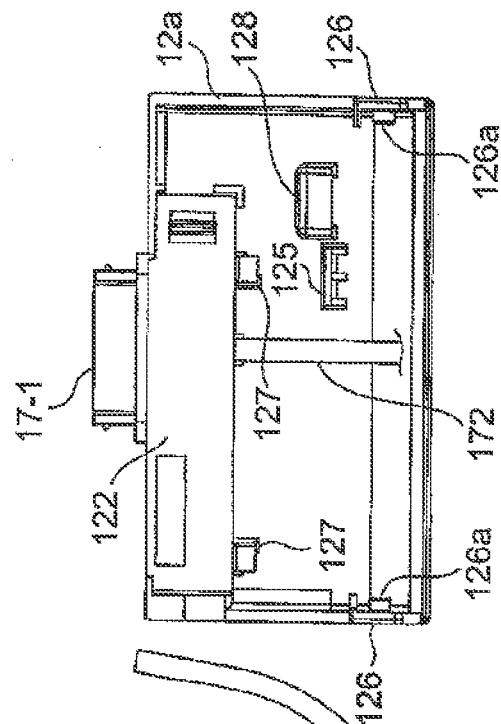
Figure 12D:
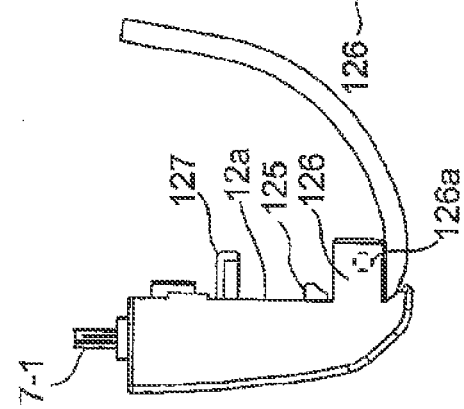
Figure 12A:
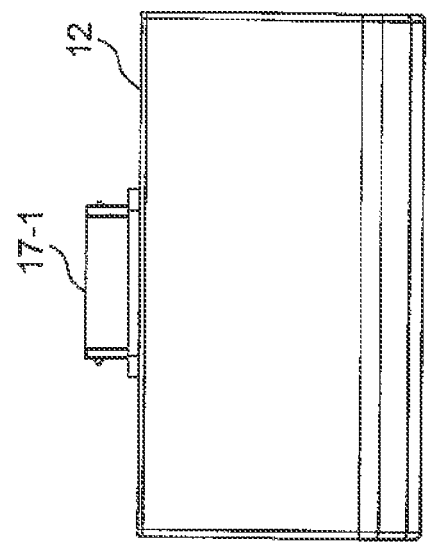
Figure 13:
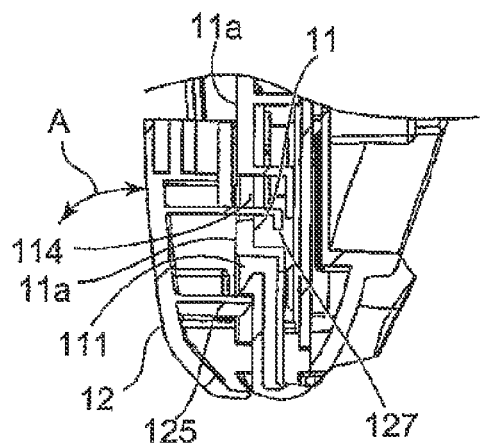
FIG. 13 is a sectional view taken along the line XIII-XIII of FIG. 5.
Figure 14:
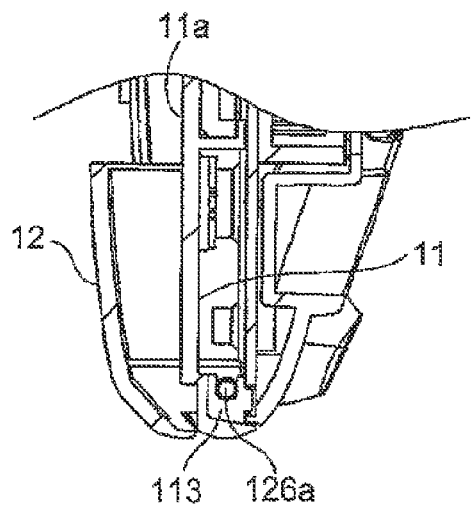
FIG. 14 is a sectional view taken along the line XIV-XIV of FIG. 5.
Figure 15:
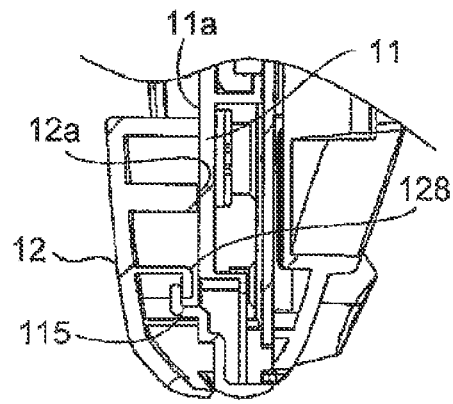
FIG. 15 is a sectional view taken along the line XV-XV of FIG. 5.

FIGS. 12A to 12D are a front view, a top view, a rear view, and a right-hand side view, respectively, illustrating the state in which the first battery-charging plug connector 17-1 is housed in and fixed to the first housing section 121 of the battery-charging cover 12. FIG. 13 is a sectional view taken along the line XIII-XIII of FIG. 5. FIG. 14 is a sectional view taken along the line XIV-XIV of FIG. 5. FIG. 15 is a sectional view taken along the line XV-XV of FIG. 5.

As illustrated in FIGS. 4 and 13, the holding base main body 11 of the battery-charging base 10 for a portable information terminal includes a lock claw 111 formed on the main mounting surface 11*a* at a position corresponding to a lower end portion of the holding base main body 11. As illustrated in FIGS. 12C and 12D, on the other hand, the battery-charging cover 12 includes a rib 125 engageable with the above-mentioned lock claw 111.

Thus, under a state in which the battery-charging cover 12 is fixed to the lower end of the main mounting surface 11*a* of the holding base main body 11, as illustrated in FIG. 13, the rib 125 of the battery-charging cover 12 is locked by the lock claw 111 formed on the main mounting surface 11*a*. When the battery-charging cover 12 in this state is pushed in a horizontal direction toward the cushions 15 that are arranged in the X-direction extending parallel to the main mounting surface 11*a*, the battery-charging cover 12 can be removed from the main mounting surface 11*a*. When the battery-charging cover 12 is to be fixed to the lower end of the main mounting surface 11*a* of the holding base main body 11, on the other hand, the battery-charging cover 12 can be fixed to the lower end of the main mounting surface 11a of the holding base body 11 through a reverse operation.

Further, as illustrated in FIGS. 12C and 12D, the battery-charging cover 12 has both side surfaces 126 extending downward on both sides of the lower end portion of the battery-charging cover 12. A pair of columnar protrusions 126a protruding inward is formed on both the side surfaces 126. As illustrated in FIG. 4, on the other hand, the main mounting surface 11a of the holding base main body 11 has a pair of insertion holes 112 formed in the lower end portion thereof so that both the above-mentioned side surfaces 126 of the battery-charging cover 12 are inserted thereinto. Further, as illustrated in FIG. 14, the holding base main body 11 has a pair of U-shaped grooves 113 formed in the lower end portion thereof at positions close to the pair of insertion holes 112 so that the above-mentioned pair of columnar protrusions 126a is fitted thereinto.

Thus, the pair of columnar protrusions 126a to be fitted into the pair of U-shaped grooves 113 acts as the above-mentioned first rotation axis of the battery-charging cover 12.

As illustrated in FIGS. 12C and 12D, the battery-charging cover 12 includes a pair of first stopper ribs 127 protruding downward from an inner wall at a center portion of the battery-charging cover 12. As illustrated in FIG. 4, on the other hand, the main mounting surface 11a of the holding base body 11 has a pair of through holes 114 formed in the lower end portion thereof so that the pair of first stopper ribs 127 passes therethrough. Thus, as illustrated in FIG. 13, the range of rotation of the battery-charging cover 12 about the above-mentioned first rotation axis (pair of columnar protrusions) 126a is limited by the pair of first stopper ribs 127 within a first predetermined angle range indicated by the arrow A of FIG. 13. In other words, the pair of first stopper ribs 127 limits, in cooperation with the holding base main body 11, the range of rotation of the battery-charging cover 12 about the first rotation axis 126a within the first predetermined angle range. In the example being illustrated, the first predetermined angle is substantially equal to 10°.

As illustrated in FIG. 12C, the battery-charging cover 12 includes a rib 128 having an L-shape in cross section, which protrudes toward the main mounting surface 11a of the holding base main body 11. As illustrated in FIGS. 4 and 15, on the other hand, the holder body 11 includes, at the lower end portion thereof, a hinge member 115 protruding from the main mounting surface 11a toward the battery-charging cover 12 and engageable with the rib 128 having an L-shape in cross section. Thus, the combination of the rib 128 having an L-shape in cross section and the hinge member 115 acts as first urging or energizing means (128, 115) for urging or energizing the battery-charging cover 12 so that a bottom surface 12a of the battery-charging cover 12 returns to a first initial position in contact with the main mounting surface 11a of the holding base main body 11.

In the first example of this invention described above, the following effects are attained.

The first effect is that the battery-charging slot 301 or 311 of one of the plurality of types of portable information terminals 30 and 31 that are different in length and width sizes and positions of the battery-charging slots can easily be connected to and disconnected from the battery-charging plug connector 17-1 or 17-2 housed in the battery-charging cover 12. The reason is because the battery-charging cover 12 for housing the battery-charging plug connector 17-1 or 17-2 is rotatable about the first rotation axis 126a provided at the lower end portion thereof.

The second effect is that the range of rotation of the battery-charging cover 12 about the first rotation axis 126a can be limited within the first predetermined angle range. The reason is because the battery-charging cover 12 includes the first stopper ribs 127.

The third effect is that there is no need to carry out the operation of returning, to the first initial position, the battery-charging cover 12 rotated about the first rotation axis 126a. The reason is because the battery-charging base 10 for a portable information terminal includes the first urging or energizing means (128, 115) for urging or energizing the battery-charging cover 12 to return to the first initial position, and therefore the battery-charging cover 12 automatically returns to the first initial position.

EXAMPLE 2

Figure 16:
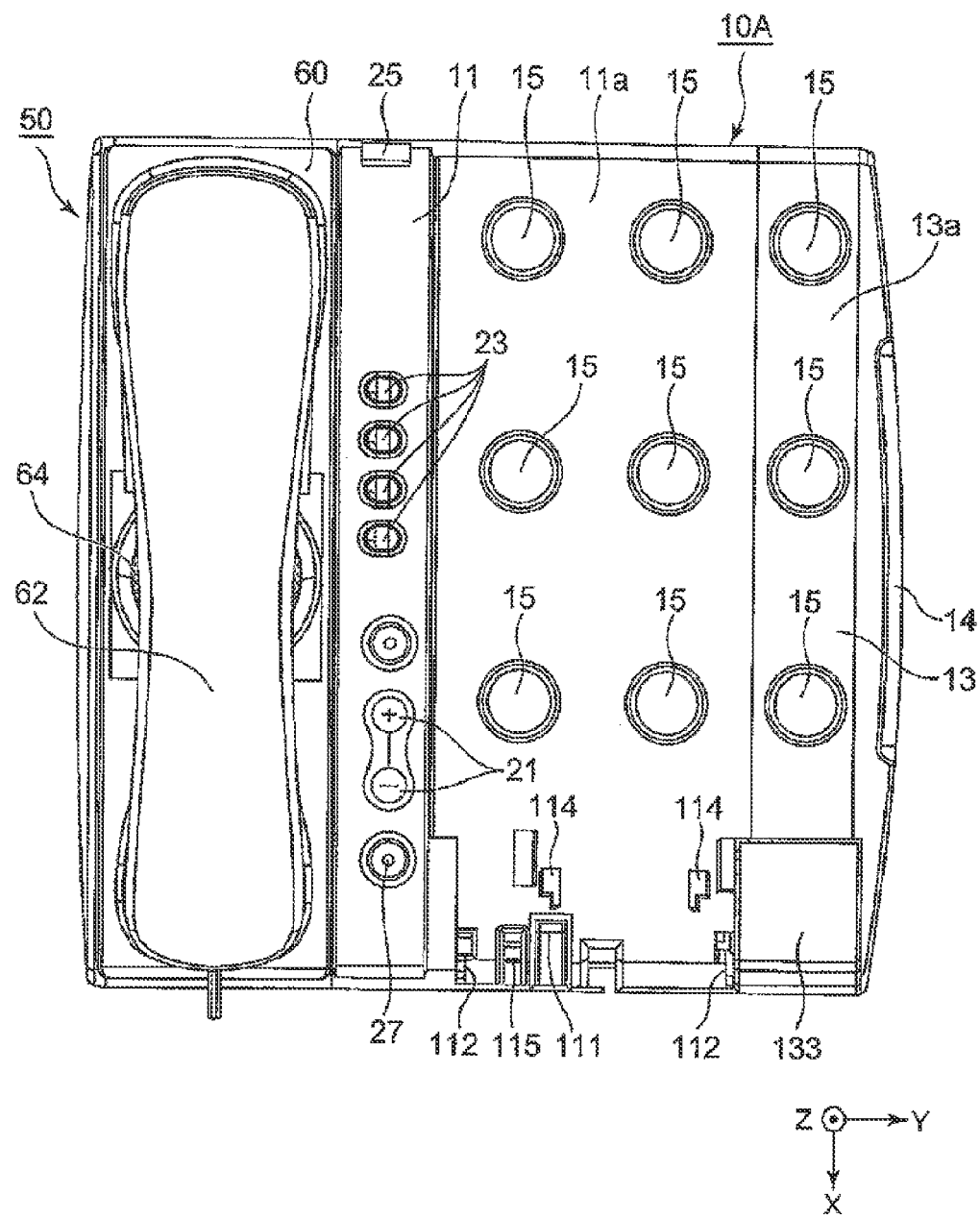
FIG. 16 is a plan view illustrating a battery-charging base for a portable information terminal according to a second example of this invention under a state in which the battery-charging cover is removed.
Figure 17:
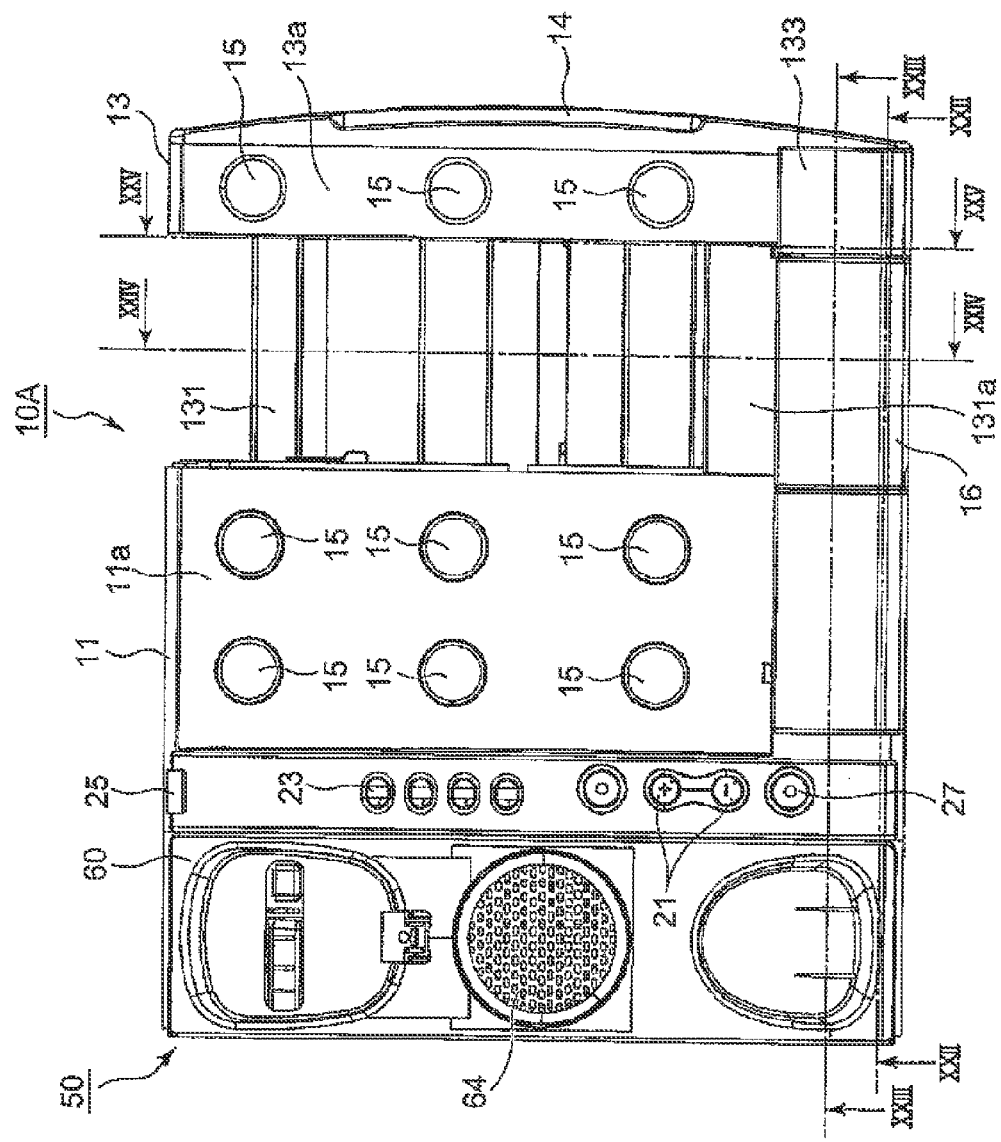
FIG. 17 is a plan view illustrating the battery-charging base for a portable information terminal illustrated in FIG. 16 under a state in which the handset is removed, an extensible holding member is extended, and an expansion battery-charging cover is fixed.
Figures 18A, 18B:
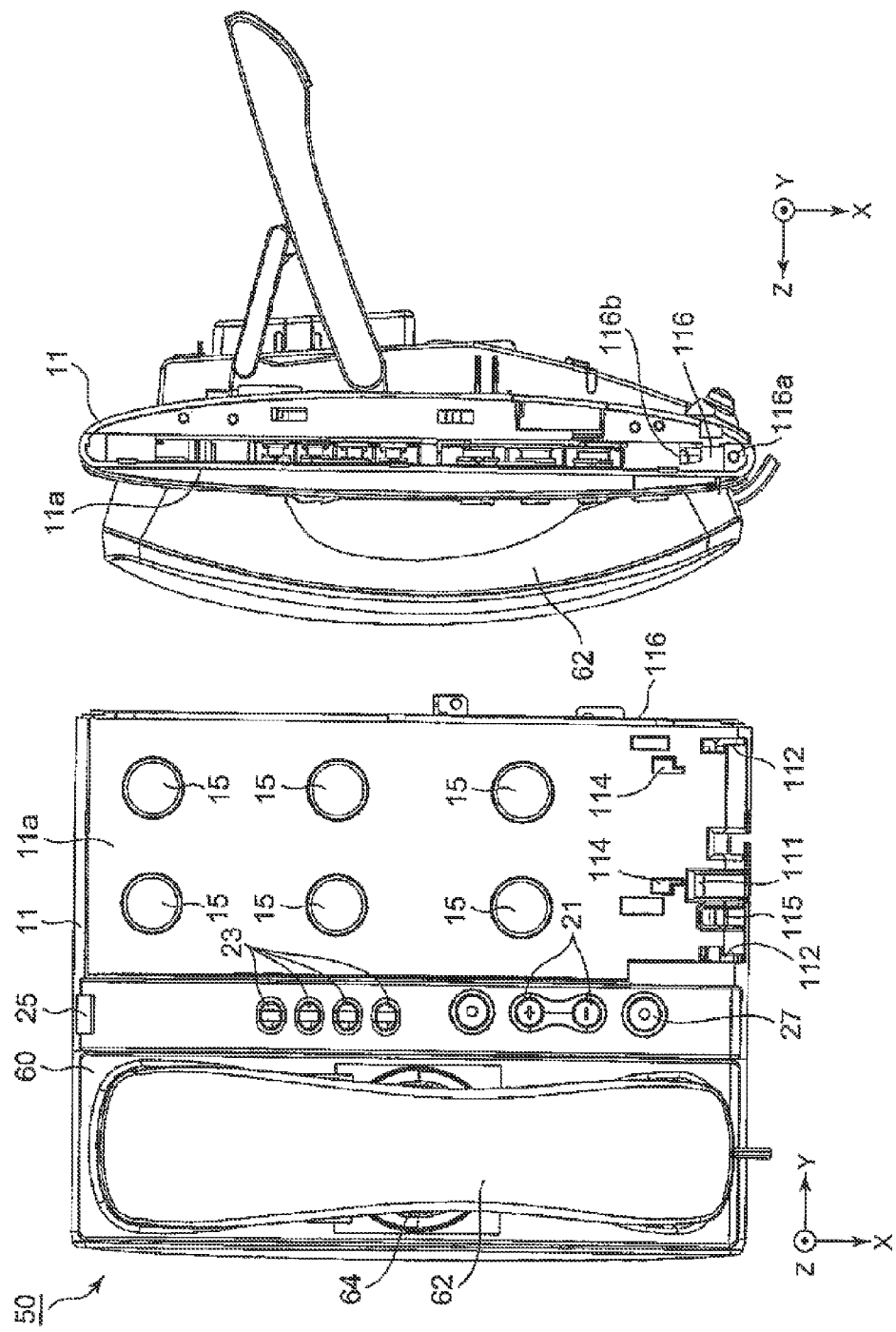
FIGS. 18A and 18B are a plan view and a right-hand side view, respectively, illustrating a state in which the extensible holding member is removed from the battery-charging base for a portable information terminal illustrated in FIG. 16.

Referring to FIGS. 16, 17, 18A, 18B, 19A, and 19B, the description will proceed to a battery-charging base 10A for a portable information terminal according to a second example of this invention. FIG. 16 is a plan view illustrating the battery-charging base 10A for a portable information terminal under a state in which a battery-charging cover 12 is removed. FIG. 17 is a plan view illustrating the battery-charging base 10A for a portable information terminal under a state in which a handset 62 is removed, an extensible holding member 13 is extended, and an expansion battery-charging cover 16 is fixed. FIGS. 18A and 18B are a plan view and a right-hand side view, respectively, illustrating a state in which the extensible holding member 13 is removed from the battery-charging base 10A for a portable information terminal of FIG. 16. FIGS. 19A and 19B are a plan view and a left-hand side view, respectively, illustrating the extensible holding member 13 thus removed.

The illustrated battery-charging base 10A for a portable information terminal has a similar configuration to that of the battery-charging base 10 for a portable information terminal illustrated in FIGS. 3 to 5 except that the extensible holding member 13 is changed so as to be slidable as described later and the expansion battery-charging cover 16 is further provided. Thus, components having similar functions to those illustrated in FIGS. 3 to 5 are represented by the same reference symbols, and only differences are therefore described below.

As illustrated in FIGS. 16, 17, 18A, 18B, 19A, and 19B, a Cartesian coordinate system (X,Y,Z) is used herein. In the state illustrated in FIGS. 16, 17, 18A, 18B, 19A, and 19B, in the Cartesian coordinate system (X,Y,Z), the X-axis direction refers to a fore-and-aft direction (depth direction) extending parallel to the main mounting surface 11a, the Y-axis direction refers to a right-and-left direction (width direction) extending parallel to the main mounting surface 11a and orthogonal to the X-axis direction, and the Z-axis direction refers to an up-and-down direction (height direction) orthogonal to the main mounting surface 11a.

The plurality of types of portable information terminals to be held and charged on the illustrated battery-charging base 10A for a portable information terminal further include a third portable information terminal 40 (see FIG. 20A) having a third length and width size larger than the second length and width size and a third battery-charging slot (third battery-charging receptacle connector) 401 provided at a position different from that of the first and second battery-charging slots.

In the example being illustrated, the third portable information terminal 40 is a tablet terminal (multifunction portable device) such as iPad having a 10-inch screen.

FIGS. 20A to 20E are views illustrating the third portable information terminal 40. FIG. 20A is a front view illustrating the third portable information terminal 40. FIG. 20B is a bottom view illustrating the third portable information terminal 40. FIG. 20C is a top view (plan view) illustrating the third portable information terminal 40. FIG. 20D is a right-hand side view illustrating the third portable information terminal 40. FIG. 20E is a left-hand side view illustrating the third portable information terminal 40.

As illustrated in FIGS. 20A and 20D, the third portable information terminal 40 has dimensions or sizes of a third length $L_3$, a third width $W_3$, and a third height $H_3$. In the example being illustrated, the third length $L_3$ is 241.2 mm, the third width $W_3$ is 185.7 mm, and the third height $H_3$ is 8.8 mm. Further, as illustrated in FIG. 20B, the third battery-charging slot (third battery-charging receptacle connector) 401 is provided at a lower end of the third portable information terminal 40. Thus, the third portable information terminal 40 has the maximum length and width size that is twice or more as large as the minimum length and width size.

As illustrated in FIG. 2A, a third battery-charging plug connector 17-3 is provided to the third portable information terminal 40 as an auxiliary part. The third battery-charging plug connector 17-3 is fixed to one end portion of the power supply cable 172.

Referring back to FIGS. 16, 17, 18A, 18B, 19A, and 19B, the extensible holding member 13 includes a slide plate 131 that is slidable inside the holding base main body 11. An extensible mounting surface 13a is movable in parallel to (on the same plane as) the main mounting surface 11a. When the extensible holding member 13 is extended to a predetermined extension position, a stopper 133 of the extensible holding member 13 supports the lower end of the third portable information terminal 40.

The expansion battery-charging cover 16 is fixed, in a freely removable manner, to a lower end of the slide plate 131 at a position between the main mounting surface 11a and the extensible mounting surface 13a under the state in which the extensible holding member 13 is extended to the predetermined extension position. The expansion battery-charging cover 16 includes a second housing section (described later) capable of housing the third battery-charging plug connector 17-3. Thus, the third battery-charging plug connector 17-3 is fixed to the second housing section of the expansion battery-charging cover 16. The expansion battery-charging cover 16 is configured to support the lower end of the third portable information terminal 40, and is rotatable about a second rotation axis 166a (see FIG. 21C) provided at a lower end portion thereof That is, the lower end of the third portable information terminal (tablet terminal) 40 is supported by the battery-charging cover 12, the expansion battery-charging cover 16, and the stopper 133 of the extensible holding member 13, and thus the third portable information terminal (tablet terminal) 40 can be held on the main mounting surface 11a and the extensible mounting surface 13a.

Note that, in the example being illustrated, the slide plate 131 is formed of a single slide plate alone, but the slide plate 131 is not limited to the single slide plate, and may be formed of a plurality of slide plates. That is, the slide plate may be formed of a plurality of slide plates each extending in the right-and-left direction Y When the extensible holding member 13 is extended to a predetermined extension position as illustrated in FIG. 17, the extensible holding member 13 can hold the third portable information terminal (tablet terminal) 40 in cooperation with the above-mentioned holding base main body 11. The stopper 133 of the extensible holding member 13 supports the lower end of the third portable information terminal (tablet terminal) 40 when the extensible mounting surface 13a is extended to the predetermined extension position.

As illustrated in FIG. 17, the battery-charging base 10A for a portable information terminal further includes an expansion battery-charging cover 16 to be fixed, in a freely removable manner, to a lower end of the slide plate 131 at a position between the main mounting surface 11a and the extensible mounting surface 13a when the extensible holding member 13 is extended to the predetermined extension position.

FIGS. 21A to 21D are a front view, a top view, a rear view, and a right-hand side view, respectively, illustrating the expansion battery-charging cover 16.

The third battery-charging plug connector 17-3 is housed in and fixed to a second housing section 161 of the expansion battery-charging cover 16. Specifically, a latching claw 163 of the second housing section 161 is engaged with a latching hole (not shown) of a pressing plate (not shown), and thus the third battery-charging plug connector 17-3 is fixed to a third fixing position while being sandwiched between the second housing section 161 and the pressing plate. In the second example, the third battery-charging plug connector 17-3 is provided to the above-mentioned third portable information terminal (tablet terminal) 40 as an auxiliary part.

The third battery-charging plug connector 17-3 is connected to a power outlet socket through the power supply cable 172 and an adapter with a plug (not shown). On the other hand, as described above, the third portable information terminal (tablet terminal) 40 has the third battery-charging slot 401 (see FIG. 20B) provided at the lower end portion thereof so that the third battery-charging plug connector 17-3 is insertable thereinto. Thus, when the third battery-charging plug connector 17-3 is inserted into the third battery-charging slot 401 of the third portable information terminal (tablet terminal) 40, a secondary battery (lithium ion battery) built into the third portable information terminal (tablet terminal) 40 can be charged.

Next, referring to FIGS. 22 to 25 as well as FIGS. 18A, 18B, 19A, 19B, and 21A to 21D, description is given of a state in which the expansion battery-charging cover 16 is fixed to the lower end of the slide plate 131 at the position between the main mounting surface 11a and the extensible mounting surface 13a.

Figure 22:
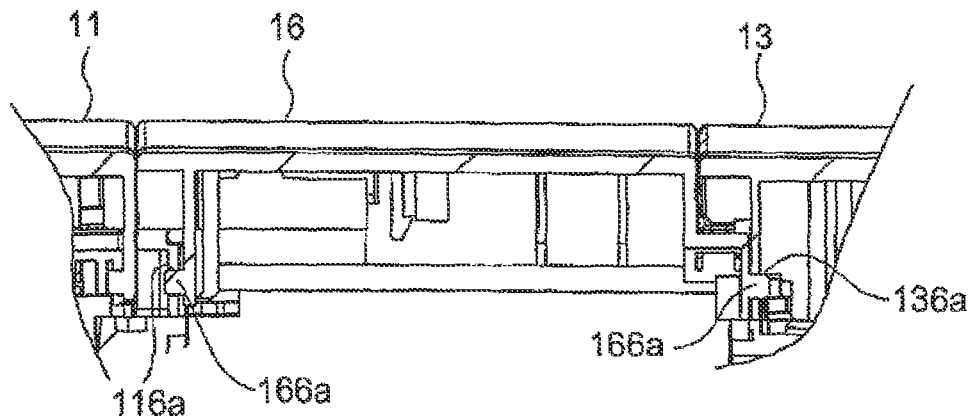
FIG. 22 is a sectional view taken along the line XXII-XXII of FIG. 17.
Figure 23:
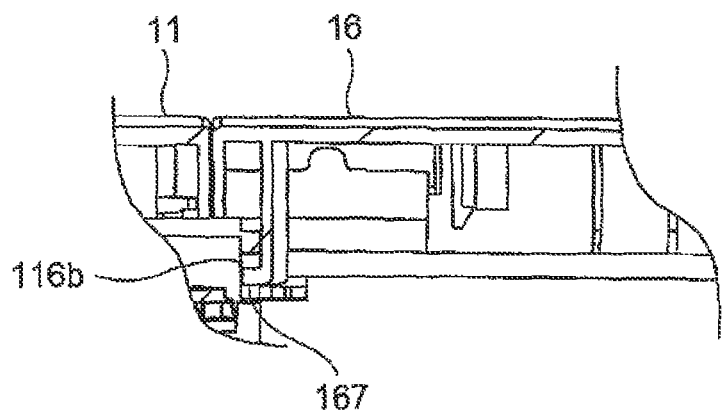
FIG. 23 is a sectional view taken along the line XXIII-XXIII of FIG. 17.
Figure 24:
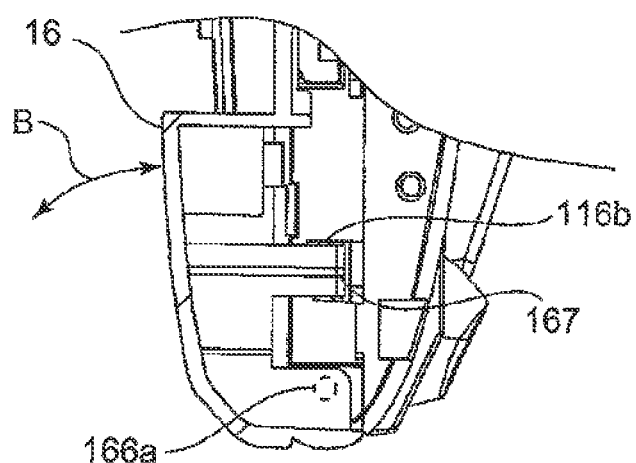
FIG. 24 is a sectional view taken along the line XXIV-XXIV of FIG. 17.
Figure 25:
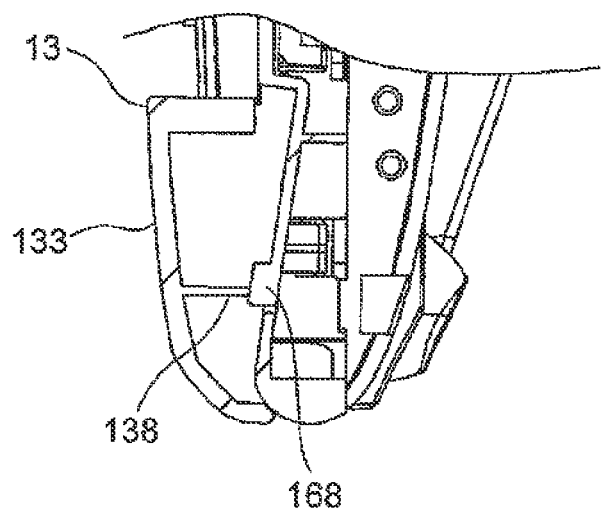
FIG. 25 is a sectional view taken along the line XXV-XXV of FIG. 17.

FIG. 22 is a sectional view taken along the line XXII-XXII of FIG. 17. FIG. 23 is a sectional view taken along the line XXIII-XXIII of FIG. 17. FIG. 24 is a sectional view taken along the line XXIV-XXIV of FIG. 17. FIG. 25 is a sectional view taken along the line XXV-XXV of FIG. 17.

As illustrated in FIGS. 21C and 21D, the expansion battery-charging cover 16 has both side surfaces 166 extending downward on both sides of the expansion battery-charging cover 16. A pair of columnar protrusions 166a protruding outward is formed on a lower end side of both the side surfaces 166. As illustrated in FIG. 18B, on the other hand, a right side surface 116 of the holding base body 11 is perforated to form a circular side hole 116a therein, and as illustrated in FIG. 19B, a left side surface 136 of the extensible holding member 13 is also perforated to form a circular side hole 136a therein. That is, as illustrated in FIG. 22, the above-mentioned pair of columnar protrusions 166a is fitted into the pair of circular side holes 116a and 136a.

Thus, the pair of columnar protrusions 166a to be fitted into the pair of circular side holes 116a and 136a acts as the above-mentioned second rotation axis of the expansion battery-charging cover 16.

As illustrated in FIGS. 21C and 21D, the expansion battery-charging cover 16 includes a pair of second stopper ribs 167 protruding outward from both the side surfaces 166 at positions above the above-mentioned pair of columnar protrusions 166a. As illustrated in FIG. 18B, on the other hand, the right side surface 116 of the holding base main body 11 is perforated to form a side guide groove (side limitation groove) 116b therein, and as illustrated in FIG. 19B, the left side surface 136 of the extensible holding member 13 is also perforated to form a side guide groove (side limitation groove) 136b therein.

That is, as illustrated in FIGS. 23 and 24, the above-mentioned pair of second stopper ribs 167 is loosely fitted into the pair of side guide grooves (side limitation grooves) 116b and 136b. Thus, the range of rotation of the expansion battery-charging cover 16 about the above-mentioned second rotation axis (pair of columnar protrusions) 166a is limited by the pair of second stopper ribs 167 and the pair of side guide grooves (side limitation grooves) 116b and 136b within a second predetermined angle range indicated by the arrow B of FIG. 24. In other words, the pair of second stopper ribs 167 limits, in cooperation with the holding base main body 11 and the extensible holding member 13, the range of rotation of the expansion battery-charging cover 16 about the second rotation axis 166a within the second predetermined angle range. In the example being illustrated, the second predetermined angle is substantially equal to 10°.

As illustrated in FIGS. 21A, 21C, and 21D, the expansion battery-charging cover 16 includes, on a right end portion side thereof, a hinge member 168 protruding upward to the extensible holding member 13. As illustrated in FIGS. 19B and 25, on the other hand, the extensible holding member 13 includes a rib 138 protruding from an inner wall of the stopper 133 thereof toward the expansion battery-charging cover 16 and engageable with the hinge member 168. Thus, the combination of the hinge member 168 and the rib 138 acts as second urging or energizing means (168, 138) for urging or energizing the expansion battery-charging cover 16 so that a bottom surface 16a of the expansion battery-charging cover 16 returns to a second initial position in contact with a main surface 131a of the slide plate 131.

In the second example of this invention described above, the following effects are further attained in addition to the first to third effects described above in the first example of this invention.

The fourth effect is that the battery-charging slot 401 of the third portable information terminal 40 having the maximum length and width size can easily be connected to and disconnected from the battery-charging plug connector 17-3 housed in the expansion battery-charging cover 16. The reason is because the expansion battery-charging cover 16 for housing the battery-charging plug connector 17-3 is rotatable about the second rotation axis 166a provided at the lower end portion thereof.

The fifth effect is that the range of rotation of the expansion battery-charging cover 16 about the second rotation axis 166a can be limited within the second predetermined angle range. The reason is because the expansion battery-charging cover 16 includes the second stopper ribs 167.

The sixth effect is that there is no need to carry out the operation of returning, to the second initial position, the expansion battery-charging cover 16 rotated about the second rotation axis 166a. The reason is because the battery-charging base 10A for a portable information terminal includes the second urging or energizing means (168, 138) for urging or energizing the expansion battery-charging cover 16 to return to the second initial position, and therefore the expansion battery-charging cover 16 automatically returns to the second initial position.

While the invention has been particularly shown and described with reference to examples thereof, the invention is not limited to these examples. It will be understood by those of ordinary skill in the art that various changes in form and details may be made therein without departing from the spirit and scope of the invention as defined by the claims. For example, in the first example, the first urging or energizing means comprises the combination of the rib 128 having an L-shape in cross section, which is formed on the battery-charging cover 12, and the hinge member 115, which is formed on the holding base main body 11, but the first urging or energizing means is not limited to this configuration, and various configurations may be employed as a matter of course. Similarly, in the second example, the second urging or energizing means comprises the combination of the hinge member 168, which is formed on the expansion battery-charging cover 16, and the rib 138, which is formed on the extensible holding member 13, but the second urging or energizing means is not limited to this configuration, and various configurations may be employed as a matter of course.

The whole or part of the exemplary embodiments (the examples) disclosed above can be describes as, but not limited to, the following supplementary notes.

(Supplementary Note 1) A battery-charging base for a portable information terminal, which is capable of holding one of a plurality of types of portable information terminals that are different in length and width sizes and positions of battery-charging slots provided at a lower end thereof, and of charging the held one of the plurality of types of portable information terminals by inserting a battery-charging plug connector into the battery-charging slot of the held one of the plurality of types of portable information terminals, the battery-charging base including:

a holding base main body for holding the one of the plurality of types of portable information terminals on a main mounting surface inclined with respect to a horizontal surface; and a battery-charging cover including a first housing section capable of housing the battery-charging plug connector while changing a housing position thereof, the battery-charging cover being fixed to a lower end of the main mounting surface in a freely removable manner, the battery-charging cover being configured to support the lower end of the one of the plurality of types of portable information terminals to be held on the main mounting surface, the battery-charging cover being rotatable about a first rotation axis provided at a lower end portion thereof.

(Supplementary Note 2) The battery-charging base for a portable information terminal according to Supplementary Note 1, in which the plurality of types of portable information terminals at least include a first portable information terminal having a first length and width size and a first battery-charging slot, and a second portable information terminal having a second length and width size larger than the first length and width size and a second battery-charging slot provided at a position different from a position of the first battery-charging slot, and in which the battery-charging base for a portable information terminal further includes an extensible holding member provided on a first side edge portion side of the holding base main body, the extensible holding member having an extensible mounting surface parallel to the main mounting surface, the extensible holding member including a stopper for supporting a lower end of the second portable information terminal.

(Supplementary Note 3) The battery-charging base for a portable information terminal according to Supplementary Note 1 or 2, in which the first rotation axis includes a pair of columnar protrusions provided on both side surfaces of the battery-charging cover and fitted into a pair of U-shaped grooves formed in the holding base main body.

(Supplementary Note 4) The battery-charging base for a portable information terminal according to any one of Supplementary Notes 1 to 3, in which the battery-charging cover further includes a first stopper rib for limiting, in cooperation with the holding base main body, a range of rotation of the battery-charging cover about the first rotation axis within a first predetermined angle range.

(Supplementary Note 5) The battery-charging base for a portable information terminal according to any one of Supplementary Notes 1 to 4, further including first urging means for urging the battery-charging cover so that a bottom surface of the battery-charging cover returns to a first initial position in contact with the main mounting surface.

(Supplementary Note 6) The battery-charging base for a portable information terminal according to Supplementary Note 5, in which the first urging means includes:
a rib having an L-shape in cross section, the rib being provided on the battery-charging cover and protruding toward the main mounting surface; and
a hinge member protruding from the main mounting surface toward the battery-charging cover and engageable with the rib having the L-shape in cross section.

(Supplementary Note 7) The battery-charging base for a portable information terminal according to any one of Supplementary Notes 1 to 6,
in which the plurality of types of portable information terminals further include a third portable information terminal having a third length and width size larger than the second length and width size and a third battery-charging slot provided at a position different from the position of the first battery-charging slot and the position of the second battery-charging slot,
in which the extensible holding member further includes a slide plate that is slidable inside the holding base main body, the extensible mounting surface being movable in parallel to the main mounting surface, when the extensible holding member is extended to a predetermined extension position, the stopper of the extensible holding member supports a lower end of the third portable information device, and
in which the battery-charging base for a portable information terminal further includes an expansion battery-charging cover to be fixed, in a freely removable manner, to a lower end of the slide plate at a position between the main mounting surface and the extensible mounting surface under a state in which the extensible holding member is extended to the predetermined extension position, the expansion battery-charging cover including a second housing section capable of housing the battery-charging plug connector, the expansion battery-charging cover being configured to support the lower end of the third portable information terminal, the expansion battery-charging cover being rotatable about a second rotation axis provided at a lower end portion thereof.

(Supplementary Note 8) The battery-charging base for a portable information terminal according to Supplementary Note 7, in which the second rotation axis includes a pair of columnar protrusions protruding outward from both side surfaces of the expansion battery-charging cover and fitted into circular side holes formed in the holding base body and the extensible holding member, respectively.

(Supplementary Note 9) The battery-charging base for a portable information terminal according to Supplementary Note 7 or 8, in which the expansion battery-charging cover further includes a second stopper rib for limiting, in cooperation with the holding base main body and the extensible holding member, a range of rotation of the expansion battery-charging cover about the second rotation axis within a second predetermined angle range.

(Supplementary Note 10) The battery-charging base for a portable information terminal according to any one of Supplementary Notes 7 to 9, further including second urging means for urging the expansion battery-charging cover so that a bottom surface of the expansion battery-charging cover returns to a second initial position in contact with a main surface of the slide plate.

(Supplementary Note 11) The battery-charging base for a portable information terminal according to Supplementary Note 10, in which the second urging means includes:
a hinge member provided on the expansion battery-charging cover; and
a rib formed on the extensible holding member and engageable with the hinge member.

REFERENCE SIGNS LIST 10, 10A battery-charging base for portable information terminal
11 holding base main body
11a main mounting surface
111 lock claw
112 insertion hole
113 U-shaped groove
114 through hole
115 hinge member
116 right side surface
116a circular side hole
116b side guide groove (side limitation groove)
12 battery-charging cover
12a bottom surface
121 first housing section
122 pressing plate
123 latching claw
124 latching hole
125 rib
126 both side surfaces
126a columnar protrusion (first rotation axis)
127 first stopper rib
128 rib having L-shape in cross section
13 extensible holding member
13a extensible mounting surface
131 slide plate
131a main surface
132 leg
133 stopper
136 left side surface 136a circular side hole
136b side guide groove (side limitation groove)
138 rib
14 side plate
15 cushion
16 expansion battery-charging cover
16a bottom surface
161 second housing section
163 latching claw
166 both side surfaces
166a (columnar protrusion) second rotation axis
167 second stopper rib
168 hinge member
17-1, 17-2, 17-3 battery-charging plug connector
172 power supply cable
21 volume button
23 function button
25 incoming call lamp
27 Bluetooth module cooperation button
30 first portable information terminal (smartphone)
301 first battery-charging slot (first battery-charging receptacle connector)
31 second portable information terminal (tablet terminal)
302 second battery-charging slot (second battery-charging receptacle connector)
40 third portable information terminal (tablet terminal)
401 third battery-charging slot (third battery-charging receptacle connector)
50 desk phone
60 call receiver section
62 handset
64 loudspeaker This application is based upon and claims the benefit of priority from Japanese Patent Application No. 2011-232514, filed on Oct. 24, 2011, the disclosure of which is incorporated herein in its entirety by reference.

The invention claimed is:

1. A battery-charging base for a portable information terminal, which is capable of holding, at the same mounting position, one of a plurality of types of portable information terminals that are different in length and width sizes and positions of battery-charging slots provided at a lower end thereof, and of charging the held one of the plurality of types of portable information terminals by inserting a battery-charging plug connector into one of the battery-charging slots of the held one of the plurality of types of portable information terminals, the battery-charging base comprising:
 a holding base main body for holding the one of the plurality of types of portable information terminals on a main mounting surface inclined with respect to a horizontal surface; and
 a battery-charging cover comprising a first housing section capable of housing the battery-charging plug connector therein so as to fix the battery-charging plug connector thereto while changing a housing position thereof, the battery-charging cover being fixed to a lower end of the main mounting surface in a freely removable manner, the battery-charging cover being configured to support the lower end of the one of the plurality of types of portable information terminals to be held on the main mounting surface, the battery-charging cover being rotatable about a first rotation axis provided at a lower end portion thereof.

2. The battery-charging base for a portable information device according to claim 1,
 wherein the plurality of types of portable information terminals at least comprise a first portable information terminal having a first length and width size and a first battery-charging slot, and a second portable information terminal having a second length and width size larger than the first length and width size and a second battery-charging slot provided at a position different from a position of the first battery-charging slot, and
 wherein the battery-charging base for a portable information device further comprises an extensible holding member provided on a first side edge portion side of the holding base main body, the extensible holding member having an extensible mounting surface parallel to the main mounting surface, the extensible holding member comprising a stopper for supporting a lower end of the second portable information terminal.

3. The battery-charging base for a portable information device according to claim 1, wherein the first rotation axis comprises a pair of columnar protrusions provided on both side surfaces of the battery-charging cover and fitted into a pair of U-shaped grooves formed in the holding base main body.

4. The battery-charging base for a portable information device according to claim 1, wherein the battery-charging cover further comprises a first stopper rib for limiting, in cooperation with the holding base main body, a range of rotation of the battery-charging cover about the first rotation axis within a first predetermined angle range.

5. The battery-charging base for a portable information device according to claim 1, further comprising first urging means for urging the battery-charging cover so that a bottom surface of the battery-charging cover returns to a first initial position in contact with the main mounting surface.

6. The battery-charging base for a portable information device according to claim 1,
 wherein the plurality of types of portable information terminals further comprise a third portable information terminal having a third length and width size larger than the second length and width size and a third battery-charging slot provided at a position different from the position of the first battery-charging slot and the position of the second battery-charging slot,
 wherein the extensible holding member further comprises a slide plate that is slidable inside the holding base main body, the extensible mounting surface being movable in parallel to the main mounting surface, when the extensible holding member is extended to a predetermined extension position, the stopper of the extensible holding member supporting a lower end of the third portable information terminal, and
 wherein the battery-charging base for a portable information device further comprises an expansion battery-charging cover to be fixed, in a freely removable manner, to a lower end of the slide plate at a position between the main mounting surface and the extensible mounting surface under a state in which the extensible holding member is extended to the predetermined extension position, the expansion battery-charging cover comprising a second housing section capable of housing the battery-charging plug connector therein so as to fix the battery-charging plug connector thereto, the expansion battery-charging cover being configured to support the lower end of the third portable information terminal, the expansion battery-charging cover being rotatable about a second rotation axis provided at a lower end portion thereof.

7. The battery-charging base for a portable information device according to claim 6, wherein the second rotation axis comprises a pair of columnar protrusions protruding outward from both side surfaces of the expansion battery-charging cover and fitted into circular side holes formed in the holding base main body and the extensible holding member, respectively.

8. The battery-charging base for a portable information device according to claim 6, wherein the expansion battery-charging cover further comprises a second stopper rib for limiting, in cooperation with the holding base main body and the extensible holding member, a range of rotation of the expansion battery-charging cover about the second rotation axis within a second predetermined angle range.

9. The battery-charging base for a portable information device according to claim 6, further comprising second urging means for urging the expansion battery-charging cover so that a bottom surface of the expansion battery-charging cover returns to a second initial position in contact with a main surface of the slide plate.

* * * * *